United States Patent
Cutler

(10) Patent No.: US 7,444,193 B2
(45) Date of Patent: Oct. 28, 2008

(54) ON-LINE DYNAMIC ADVISOR FROM MPC MODELS

(75) Inventor: Charles R. Cutler, San Antonio, TX (US)

(73) Assignee: Cutler Technology Corporation San Antonio Texas (US), San Antonio, TX (US)

( * ) Notice: Subject to any disclaimer, the term of this patent is extended or adjusted under 35 U.S.C. 154(b) by 286 days.

(21) Appl. No.: 11/152,919

(22) Filed: Jun. 15, 2005

(65) Prior Publication Data

US 2006/0287741 A1 Dec. 21, 2006

(51) Int. Cl.
- G06F 7/60 (2006.01)
- G06G 7/48 (2006.01)
- G05B 13/02 (2006.01)
- G05B 15/00 (2006.01)
- G01N 21/00 (2006.01)

(52) U.S. Cl. .............................. 700/83; 700/39; 700/43; 422/62; 703/2; 703/6

(58) Field of Classification Search ............... 700/83, 700/39, 44; 703/2, 6; 422/62
See application file for complete search history.

(56) References Cited

U.S. PATENT DOCUMENTS

| | | | |
|---|---|---|---|
| 4,349,869 A | 9/1982 | Prett et al. | |
| 4,616,308 A | 10/1986 | Morshedi et al. | |
| 4,663,703 A * | 5/1987 | Axelby et al. | 700/29 |
| 5,347,446 A | 9/1994 | Iino et al. | |
| 5,566,065 A | 10/1996 | Hansen et al. | |
| 5,568,378 A | 10/1996 | Wojsznis | |
| 6,056,781 A | 5/2000 | Wassick et al. | |
| 6,088,630 A | 7/2000 | Cawlfield | |
| 6,980,938 B2 * | 12/2005 | Cutler | 703/2 |
| 2002/0072882 A1 * | 6/2002 | Kruger et al. | 703/2 |
| 2003/0195665 A1 | 10/2003 | Cutler | |

FOREIGN PATENT DOCUMENTS

JP 53125739 A 11/1978

OTHER PUBLICATIONS

Bequette, titled, "Process Control-Modeling, Design, and Simulation" 2003 Rensselaer Polytechnic Institute pp. 88, 168-170, 172-178, 195, 197-201, 245-247,250,274,275,277,539-542,556,559-566.*
Muller et al., "Efficient Integration of Real-Time Hardware and Web Based Serivces into MATLAB:" 1999 European Symposium p. 41-45.*
Sanders-F.F., "Continuous Control Gets On-Line Advisor" 1992 Intech. p. 32-35.*
Linkens-D.A., "Intelligent and Adaptive Control in Anesthesia" 1992 IEEE, p. 2294-2296.*

* cited by examiner

Primary Examiner—Albert DeCady
Assistant Examiner—Thomas H Stevens
(74) Attorney, Agent, or Firm—M.A. Erwin & Associates; Michael A. Ervin

(57) ABSTRACT

A method is disclosed for removing the dynamics of the PID controllers from a Model Predictive Controller that was developed using identification testing of a process. This then allows the creation of a very fast final control element based on-line operator advisor that operates in conjunction with the process so that it has access to real time data and provides an ongoing prediction of the future state of the process as well as the capability to investigate alternate scenarios of control possibilities.

10 Claims, 8 Drawing Sheets

ON-LINE DYNAMIC ADVISOR FROM MPC MODELS

BACKGROUND OF THE INVENTION

Model Predictive Control (MPC) refers to a class of algorithms that compute a sequence of manipulated variable adjustments in order to optimize the future behavior of complex multivariable processes. Originally developed to meet the needs of petroleum refineries and chemical processes, MPC can now be found in a wide variety of application areas including chemicals, food processing, automotive, aerospace, metallurgy, and pulp and paper. A well-known implementation of MPC in chemical and refinery applications is Dynamic Matrix Control or DMC.

The MPC Controller employs a software model of the process to predict the effect of past changes of manipulated variable and measurable disturbances on the output variables of interest. The independent variables are computed so as to optimize future system behavior over a time interval known as the prediction horizon. In the general case any desired objective function can be used for the optimization. The system dynamics are described by an explicit process model, which can take, in principle, a number of different mathematical forms. Process input and output constraints are included directly in the problem formulation so that future constraint violations are anticipated and prevented.

In practice a number of different approaches have been developed and commercialized in implementing MPC Controllers. The most successful implementations have made use of a linear model for the plant dynamics. The linear model is developed in a first step by gathering data on the process by introducing test disturbances on the independent variables and measuring the effects of the disturbances on the dependent variables. This initial step is referred to as Identification.

U.S. Pat. Nos. 4,349,869 and 4,616,308 describe an implementation of MPC control called Dynamic Matrix Control (DMC). These patents describe the MPC algorithms based on linear models of a plant and describe how process constraints are included in the problem formulation. Initial identification of the MPC controller using process data is also described.

By way of further background this Identification of process dynamics requires a pre-test in which the independent variables of the process are moved in some pattern to determine the effect on the dependent variables. In a chemical or refinery process the independent variables include the PID (proportional-integral-derivative) controller set points for selected dependent variables, the final control element positions of PID controllers in manual, and temperatures, material flows, pressures and compositions that are determined outside the scope of the controller's domain. For any process Identification test, the independent variables are fixed for the analysis of the data. Further the tuning of any of the PID controllers in the domain of the MPC controller is fixed. The MPC controller that is built to use the dynamic process models from the Identification must have exactly the same configuration of independent variables that existed when the Identification was performed. Thus the PID controller configuration that is present during Identification imbeds the PID controller dynamics in the dynamic model. Because the PID dynamics are a part of the plant behavior there is an inherent correlation of variables that happens as unmeasured disturbances occur in the process. The various PID control loops respond to those unmeasured disturbances and move many of the controlled variables in response. This has historically always prevented practitioners from creating MPC controllers free of the PID dynamics using standard identification tests.

U.S. Pat. No. 6,980,938 by the inventor is incorporated by reference into this application in its entirety. This patent addresses the aforementioned issue and describes a methodology for removing the PID dynamics from the dynamic model by use of a novel mathematical matrix algorithm that interchanges selected final control element position (usually valve positions) controlled variables with their corresponding selected independently controllable, manipulated PID controller set point variables in the linearized model using matrix row elimination mathematics to generate a second linearized model that has a new set of independently controllable, manipulated variables, the second model having the dynamics of the selected independently controllable, manipulated PID controller set point variables removed from the model. This second linearized model is an open loop model based on final control element positions only. Because it is an open loop finite impulse response model it has been shown that it can run 50 to 100 times faster than real time. U.S. Pat. No. 6,980,938 describes and claims the use of this type of model in both control and in the development of off-line training simulators.

A greatly desired but unmet need in the control of complex multivariable processes such as chemical manufacturing and oil refining is the possibility of a fast on-line advisor for the operator. This can be used in two important ways. In a foreground mode the operator advisor can run to provide a continuous prediction of where the process is going based on the past changes in the independent variables and configuration. In a background mode the advisor can advise the operator and provide a training mode to teach new and experienced operators through the use of scenarios. This capability has never been available in the prior art or in practice. The obvious payout for this capability is the prevention of unscheduled shutdowns and safety of the unit.

The recognition of this unmet need and a method of addressing the need by use of an open loop finite impulse response model with the PID dynamics removed coupled with an emulation of the PID controllers and having this new model coupled to a DCS is an aspect of this invention.

BRIEF SUMMARY OF THE INVENTION

An object of this invention is to provide a method for removing the dynamics of the PID controllers from the MPC controller that was created by a plant identification test. This enables the creation of a final control element based FIR model of the process. This final control element-based model can then be coupled to an emulation of the PID control scheme and coupled through a distributed control system (DCS) console to create a fast and authentic on-line operator advisor to guide operators during operation of the process. Because the dynamics of the PID controllers have been decoupled from the final control element based FIR model this on-line operator advisor can be used in various control configurations without having to repeat the plant identification test. This type of on-line advisor has never before been achieved.

It is a further object of this invention to provide such a method that can be used in various implementations of MPC controllers.

It is a further object of this invention to provide a method to create such an on-line advisor for complex multivariable processes that can be modified with new regulatory control configurations or new tuning and to do so without having to conduct new identification testing of the process.

An object of the invention is achieved by a method for creating an on-line operator advisor for a process to use in process simulation and for training simulators created by removing the effect of PID dynamics and thus the effect of unmeasured disturbances from the dynamics of a controller model of a process having a plurality of independently controllable, manipulated variables and at least one controlled variable dependent upon the independently controllable, manipulated variables comprising the steps of: gathering data about the process by separately introducing a test disturbance in each of the manipulated variables and measuring the effect of the disturbances on the controlled variable; using the effects of the disturbances on the controlled variable to generate a first linearized dynamic model relating the at least one controlled variable to the independently controllable, manipulated variables; interchanging selected final control element position controlled variables with their corresponding selected independently controllable, manipulated PID controller set point variables in the first linearized dynamic model using matrix row elimination mathematics to generate a second linearized dynamic model that has a new set of independently controllable, manipulated variables, the second linearized dynamic model having the dynamics of the selected independently controllable, manipulated PID controller set point variables removed from the second linearized dynamic model; externally emulating desired regulatory control schemes via mathematical emulators to emulate PID controllers in manual, cascade, or automatic modes to obtain a completed model of the process.

Another aspect of the invention is the use of the completed model so described by accessing the real time data from the process to initialize the completed model with the state of the dependent and independent variables, initializing a configuration of the regulatory control system, and initializing with the state of the prediction vectors so that the completed model can then be mathematically solved to predict the future path of the controlled variables.

It should be noted that a regulatory control scheme can be easily emulated external to the process model via a DCS console or console emulator available in modern control packages. This allows the operator to put PID controllers in Manual-mode, break cascades, retune PID controller, or even re-configure the regulatory control scheme.

The most common method of Identification currently used in oil refining and chemical processes is the Dynamic Matrix Identification (DMI). DMI will be used to illustrate the methodology of this invention, but it should be understood that the invention is not limited to a specific Identification technique.

DETAILED DESCRIPTION OF INVENTION

Figure 1:
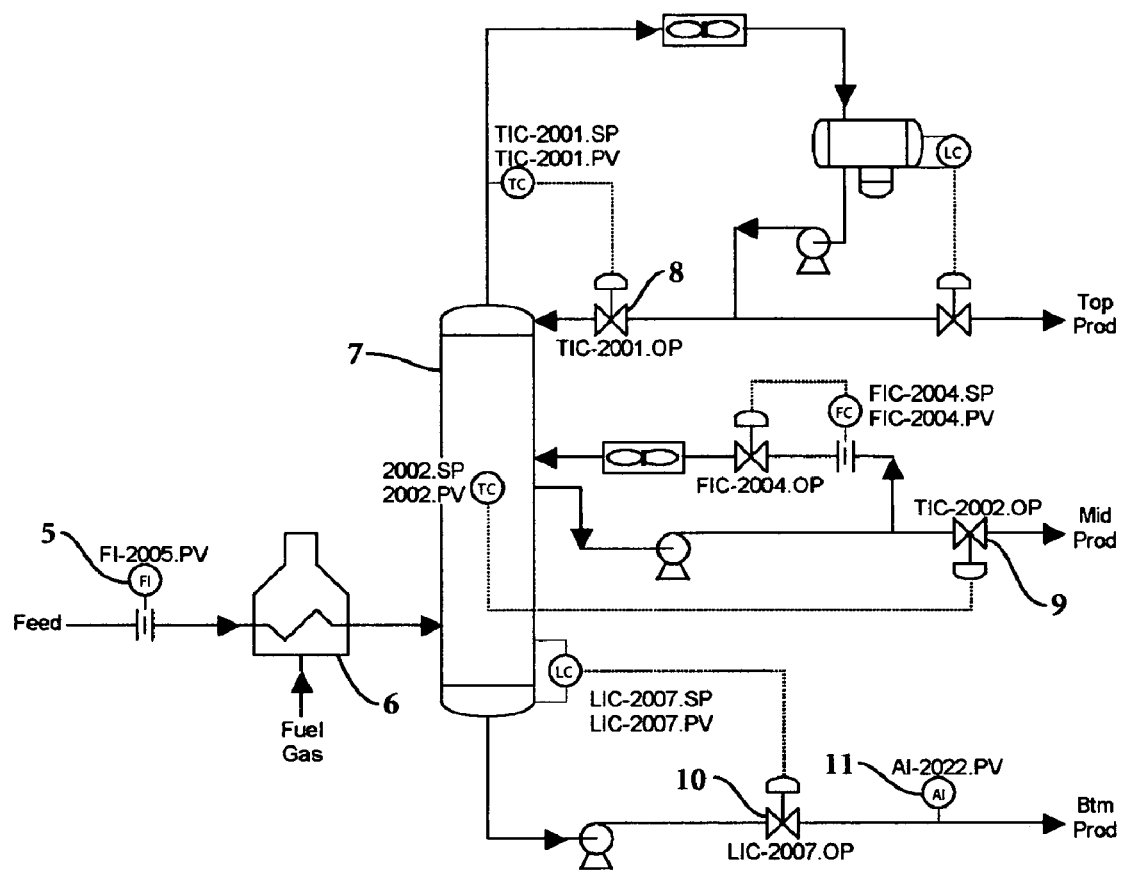
FIG. 1 is a flow schematic of a fractionator

The invention is a method used in conjunction with model predictive control for removing the dynamics of PID controllers from an MPC controller of a process in order to subsequently create an on-line advisor of the process.

An MPC process model is a set of linear equations so it should be mathematically possible to interchange any independent variable with a dependent variable provided a relation exists between the independent and dependent variable. A candidate set for that transformation is the-set point (independent) for a PID controller and the associated final control element position (dependent) for that PID controller.

An MPC controller is often based on a linear model of a process system. Although the invention to be described here has applications in many fields the examples used will be from chemical and refinery process applications.

There are two types of variables in any system; the independent variables and the dependent variables. The independent variables are inputs to the system. The independent variables are further divided into manipulated and disturbance (feedforward) variables. Manipulated variables are those that can be changed by the human operator, such as final control element positions or PID controller set points. Disturbance variables are those independent variables that have an effect on the system, but cannot be changed by the human operator. Variables such as feed composition, feed temperature, and ambient temperature are examples of disturbance variables.

Dependent variables are outputs from the system. Dependent variables are affected by changes in the independent variables. The human operator cannot directly change them. The values of dependent variables can be controlled, however, by correctly changing the values of the manipulated variables. Further, as disturbances enter the system, the manipulated variables must be correctly adjusted to counteract the disturbance.

The use of linear models allows the use of matrix mathematics in describing complex and multivariable control. There are several general formulations of MPC models. A general model for control is the step response model:

$$\delta \overline{O}_1 = A_{1,1}\Delta \overline{I}_1 + \ldots + A_{1,j}\Delta \overline{I}_j + \ldots + A_{1,nind}\Delta \overline{I}_{nind}$$

$$\delta \overline{O}_i = A_{i,1}\Delta \overline{I}_1 + \ldots + A_{i,j}\Delta \overline{I}_j + \ldots + A_{i,nind}\Delta \overline{I}_{nind}$$

$$\delta \overline{O}_{ndep} = A_{ndep,1}\Delta \overline{I}_1 + \ldots + A_{ndep,j}\Delta \overline{I}_j + \ldots + A_{ndep,nind}\Delta \overline{I}_{nind}$$

Equation 1: Step Response Dynamic Matrix, Block Matrix Form where, $$\delta \overline{O}_i = \begin{bmatrix} O_{i,1} - O_{i,0} \\ O_{i,2} - O_{i,0} \\ O_{i,3} - O_{i,0} \\ \vdots \\ O_{i,ncoef} - O_{i,0} \end{bmatrix},$$

the accumulative change in the $i^{th}$ dependent variable at each time step, $$\ddot{A}\bar{I}_j = \begin{bmatrix} \Delta I_{j,1} \\ \Delta I_{j,2} \\ \Delta I_{j,3} \\ \vdots \\ \Delta I_{j,ncoef} \end{bmatrix},$$

the step change in the $j^{th}$ independent variable at each time step, and $$A_{i,j} = \begin{bmatrix} a_{i,j,1} & & & & \\ a_{i,j,2} & a_{i,j,1} & & & \\ a_{i,j,3} & a_{i,j,2} & a_{i,j,1} & & \\ \vdots & \vdots & \vdots & \ddots & \\ a_{i,j,ncoef} & a_{i,j,(ncoef-1)} & a_{i,j,(ncoef-2)} & \cdots & a_{i,j,1} \end{bmatrix},$$

the Dynamic Matrix.

An alternate form of this Step Response equation is the Finite Impulse Response (FIR) form. It can be derived from the Step Response form as described below.

Recalling from the definitions that:

$b_{i,j,k} = a_{i,j,k}$ for $k=1$, $b_{i,j,k} = a_{i,j,k} - a_{i,j,(k-1)}$ for $k:2 \to ncoef$ and that $\Delta O_{i,k} = O_{i,k} - O_{i,(k-1)}$ for $k:1 \to ncoef$ we can difference the above system of equations to give:

$\ddot{A}\overline{O}_1 = B_{1,1}\ddot{A}\bar{I}_1 + \ldots + B_{1,j}\ddot{A}\bar{I}_j \ldots + B_{1,nind}\ddot{A}\bar{I}_{nind}$ $\ddot{A}\overline{O}_i = B_{i,1}\ddot{A}\bar{I}_1 \ldots + B_{i,j}\ddot{A}\bar{I}_j \ldots + B_{i,nind}\ddot{A}\bar{I}_{nind}$ $\ddot{A}\overline{O}_{ndep} B_{ndep,1}\ddot{A}\bar{I}_1 \ldots + B_{ndep,j}\ddot{A}\bar{I}_j \ldots + B_{ndep,nind}\ddot{A}\bar{I}_{nind}$ Equation 2: Finite Impulse Response Equations—Block Matrix Form where $$\ddot{A}\overline{O}_i = \begin{bmatrix} O_{i,1} - O_{i,0} \\ O_{i,2} - O_{i,1} \\ O_{i,3} - O_{i,2} \\ \vdots \\ O_{i,ncoef} - O_{i,(ncoef-1)} \end{bmatrix},$$

the change in the $i^{th}$ dependent variable across each time interval, $$\ddot{A}\bar{I}_j = \begin{bmatrix} \Delta I_{j,1} \\ \Delta I_{j,2} \\ \Delta I_{j,3} \\ \vdots \\ \Delta I_{j,ncoef} \end{bmatrix}$$

as above, and $$B_{i,j} = \begin{bmatrix} b_{i,j,1} & & & & \\ b_{i,j,2} & b_{i,j,1} & & & \\ b_{i,j,3} & b_{i,j,2} & b_{i,j,1} & & \\ \vdots & \vdots & \vdots & \ddots & \\ b_{i,j,ncoef} & b_{i,j,(ncoef-1)} & b_{i,j,(ncoef-2)} & \cdots & b_{i,j,1} \end{bmatrix},$$

the model matrix of Impulse Coefficients.

There are five forms of these equations, and we have shown only the first two. While these forms are mathematically equivalent, and while all forms may be used for identification prediction and control, they have very different properties.

$\delta\overline{O} = A\Delta\bar{I}$—Most often used for control calculations.

$\Delta\overline{O} = B\Delta\bar{I}$—Used for identification of steady state variables.

$\Delta\Delta\overline{O} = B\Delta\Delta\bar{I}$—Used for identification of ramp variables.

$\delta\overline{O} = B\delta\bar{I}$—Not commonly used. Old IDCOM control formulation.

$\Delta\overline{O} = A\Delta\Delta\bar{I}$—Not commonly used.

C. R. Cutler and C. R. Johnston discuss the properties of these forms of the matrix in a paper, "Analysis of the Forms of the Dynamic Matrix", in the Proceedings of the Instrument Society of America ISA 85 Advances in Instrumentation Volume 40, Number 1—October 1985.

The use of these linear modeling techniques, including the identification of the model and the use of the model for control and the use in control with constraints is described in two U.S Pat. Nos. 4,349,869 and 4,616,308. These patents are incorporated herein by reference.

We will now derive the algorithm of this invention to demonstrate the removal of the PID (proportional-integral-derivative) dynamics from the controller. The derivation is from the FIR model of equation 2. To derive the algorithm, we assume that the $\hat{j}^{th}$ independent variable is the set point of a PID controller and the $\hat{i}^{th}$ dependent is the PID final control element response to that set point change. The final control element in many processes is a valve but it can be other things such as the speed setting on a motor. The term final control element anticipates any of those elements that are responsive to a PID control loop. We wish to re-constitute the model so that the final control element is the independent variable in the process model; that is to say, we wish to remove the dynamics of this PID controller from all affected model responses. This can be accomplished by interchanging the $\hat{i}^{th}$ dependent variable with the $\hat{j}^{th}$ dependent variable, as follows:

$$\begin{bmatrix} B_{1,1} & \cdots & B_{1,(\hat{j}-1)} & B_{1,\hat{j}} & B_{1,(\hat{j}+1)} & \cdots & B_{1,nind} \\ \vdots & \ddots & \vdots & \vdots & \vdots & \ddots & \vdots \\ B_{(\hat{i}-1),1} & \cdots & B_{(\hat{i}-1),(\hat{j}-1)} & B_{(\hat{i}-1),\hat{j}} & B_{(\hat{i}-1),(\hat{j}+1)} & \cdots & B_{(\hat{i}-1),nind} \\ B_{\hat{i},1} & \cdots & B_{\hat{i},(\hat{j}-1)} & B_{\hat{i},\hat{j}} & B_{\hat{i},(\hat{j}+1)} & \cdots & B_{\hat{i},nind} \\ B_{(\hat{i}+1),1} & \cdots & B_{(\hat{i}+1),(\hat{j}-1)} & B_{(\hat{i}+1),\hat{j}} & B_{(\hat{i}+1),(\hat{j}+1)} & \cdots & B_{(\hat{i}+1),nind} \\ \vdots & \ddots & \vdots & \vdots & \vdots & \ddots & \vdots \\ B_{ndep,i} & \cdots & B_{ndep,(\hat{j}-1)} & B_{ndep,\hat{j}} & B_{ndep,(\hat{j}+1)} & \cdots & B_{ndep,nind} \end{bmatrix} \times \begin{bmatrix} \Delta \bar{I}_1 \\ \vdots \\ \Delta \bar{I}_{(\hat{j}-1)} \\ \Delta \bar{I}_{\hat{j}} \\ \Delta \bar{I}_{(\hat{j}+1)} \\ \vdots \\ \Delta \bar{I}_{nind} \end{bmatrix} =$$

-continued $$\begin{bmatrix} I & \cdots & 0 & 0 & 0 & \cdots & 0 \\ \vdots & \ddots & \ddots & \ddots & \ddots & \ddots & \vdots \\ 0 & \ddots & I & 0 & 0 & \ddots & 0 \\ 0 & \ddots & 0 & I & 0 & \ddots & 0 \\ 0 & \ddots & 0 & 0 & I & \ddots & 0 \\ \vdots & \ddots & \ddots & \ddots & \ddots & \ddots & \vdots \\ 0 & \cdots & 0 & 0 & 0 & \cdots & I \end{bmatrix} \times \begin{bmatrix} \Delta\overline{O}_1 \\ \vdots \\ \Delta\overline{O}_{(\hat{i}-1)} \\ \Delta\overline{O}_{\hat{i}} \\ \Delta\overline{O}_{(\hat{i}+1)} \\ \vdots \\ \Delta\overline{O}_{ndep} \end{bmatrix}$$

where $I = \begin{bmatrix} 1 & 0 & \cdots & 0 & 0 \\ 0 & 1 & \ddots & 0 & 0 \\ \vdots & & \ddots & & \vdots \\ 0 & 0 & \ddots & 1 & 0 \\ 0 & 0 & \cdots & 0 & 1 \end{bmatrix}$, the Identity Matrix. Note that this is nothing more than equation 2 above with an Identity matrix multiplying the $\Delta O$'s.

By performing row elimination operations (pivoting), we get;

$$\begin{bmatrix} \hat{B}_{1,1} & \cdots & \hat{B}_{1,(\hat{j}-1)} & 0 & \hat{B}_{1,(\hat{j}+1)} & \cdots & \hat{B}_{1,nind} \\ \vdots & \ddots & \vdots & \vdots & \vdots & \ddots & \vdots \\ \hat{B}_{(\hat{i}-1),1} & \cdots & \hat{B}_{(\hat{i}-1),(\hat{j}-1)} & 0 & \hat{B}_{(\hat{i}-1),(\hat{j}+1)} & \cdots & \hat{B}_{(\hat{i}-1),nind} \\ \hat{B}_{\hat{i},1} & \cdots & \hat{B}_{\hat{i},(\hat{j}-1)} & -I & \hat{B}_{\hat{i},(\hat{j}+1)} & \cdots & \hat{B}_{\hat{i},nind} \\ \hat{B}_{(\hat{i}+1),1} & \cdots & \hat{B}_{(\hat{i}+1),(\hat{j}-1)} & 0 & \hat{B}_{(\hat{i}+1),(\hat{j}+1)} & \cdots & \hat{B}_{(\hat{i}+1),nind} \\ \vdots & \ddots & \vdots & \vdots & \vdots & \ddots & \vdots \\ \hat{B}_{ndep,i} & \cdots & \hat{B}_{ndep,(\hat{j}-1)} & 0 & \hat{B}_{ndep,(\hat{j}+1)} & \cdots & \hat{B}_{ndep,nind} \end{bmatrix} \times \begin{bmatrix} \Delta\overline{I}_1 \\ \vdots \\ \Delta\overline{I}_{(\hat{j}-1)} \\ \Delta\overline{I}_{\hat{j}} \\ \Delta\overline{I}_{(\hat{j}+1)} \\ \vdots \\ \Delta\overline{I}_{nind} \end{bmatrix} =$$

$$\begin{bmatrix} I & \cdots & 0 & -\hat{B}_{1,\hat{j}} & 0 & \cdots & 0 \\ \vdots & \ddots & \vdots & \vdots & \vdots & \ddots & \vdots \\ 0 & \ddots & I & -\hat{B}_{(\hat{i}-1),\hat{j}} & 0 & \ddots & 0 \\ 0 & \ddots & 0 & -\hat{B}_{\hat{i},\hat{j}} & 0 & \ddots & 0 \\ 0 & \ddots & 0 & -\hat{B}_{(\hat{i}+1),\hat{j}} & I & \ddots & 0 \\ \vdots & \ddots & \vdots & \vdots & \vdots & \ddots & \vdots \\ 0 & \cdots & 0 & -\hat{B}_{ndep,\hat{j}} & 0 & \cdots & I \end{bmatrix} \times \begin{bmatrix} \Delta\overline{O}_1 \\ \vdots \\ \Delta\overline{O}_{(\hat{i}-1)} \\ \Delta\overline{O}_{\hat{i}} \\ \Delta\overline{O}_{(\hat{i}+1)} \\ \vdots \\ \Delta\overline{O}_{ndep} \end{bmatrix}$$

Which can be written as:

$$\Delta\overline{I}_{\hat{j}} + \begin{bmatrix} \hat{B}_{1,(\hat{j}+1)} \\ \vdots \\ \hat{B}_{(\hat{i}-1),(\hat{j}+1)} \\ \hat{B}_{\hat{i},(\hat{j}+1)} \\ \hat{B}_{(\hat{i}+1),(\hat{j}+1)} \\ \vdots \\ \hat{B}_{ndep,(\hat{j}+1)} \end{bmatrix} \times \Delta\hat{I}_{(\hat{j}+1)} \cdots + \begin{bmatrix} \hat{B}_{1,nind} \\ \vdots \\ \hat{B}_{(\hat{i}-1),nind} \\ \hat{B}_{\hat{i},nind} \\ \hat{B}_{(\hat{i}+1),nind} \\ \vdots \\ \hat{B}_{ndep,nind} \end{bmatrix} \times$$

$$\Delta\overline{I}_{nind} = \begin{bmatrix} I \\ \vdots \\ 0 \\ 0 \\ 0 \\ \vdots \\ 0 \end{bmatrix} \times \Delta\overline{O}_1 + \ldots + \begin{bmatrix} 0 \\ \vdots \\ I \\ 0 \\ 0 \\ \vdots \\ 0 \end{bmatrix} \times \Delta\overline{O}_{(\hat{i}-1)} + \begin{bmatrix} -\hat{B}_{1,\hat{j}} \\ \vdots \\ -\hat{B}_{(\hat{i}-1),\hat{j}} \\ -\hat{B}_{\hat{i},\hat{j}} \\ -\hat{B}_{(\hat{i}+1),\hat{j}} \\ \vdots \\ -\hat{B}_{ndep,\hat{j}} \end{bmatrix} \times$$

$$\Delta\overline{O}_{\hat{i}} + \begin{bmatrix} 0 \\ \vdots \\ 0 \\ 0 \\ I \\ \vdots \\ 0 \end{bmatrix} \times \Delta\overline{O}_{(\hat{i}+1)} + \ldots + \begin{bmatrix} 0 \\ \vdots \\ 0 \\ 0 \\ 0 \\ \vdots \\ I \end{bmatrix} \times \Delta\overline{O}_{ndep}$$

Which can be rearranged to;

$$\begin{bmatrix} \hat{B}_{1,1} \\ \vdots \\ \hat{B}_{(i-1),1} \\ \hat{B}_{i,1} \\ \hat{B}_{(i+1),1} \\ \vdots \\ \hat{B}_{ndep,1} \end{bmatrix} \times \Delta \bar{I}_1 + \ldots + \begin{bmatrix} \hat{B}_{1,(j-1)} \\ \vdots \\ \hat{B}_{(i-1),(j-1)} \\ \hat{B}_{i,(j-1)} \\ \hat{B}_{(i+1),(j-1)} \\ \vdots \\ \hat{B}_{ndep,(j-1)} \end{bmatrix} \times \Delta \bar{I}_{(j-1)} + \begin{bmatrix} \hat{B}_{1,j} \\ \vdots \\ \hat{B}_{(i-1),j} \\ \hat{B}_{i,j} \\ \hat{B}_{(i+1),j} \\ \vdots \\ \hat{B}_{ndep,j} \end{bmatrix} \times$$

$$\Delta \overline{O}_i + \begin{bmatrix} \hat{B}_{1,(j+1)} \\ \vdots \\ \hat{B}_{(i-1),(j+1)} \\ \hat{B}_{i,(j+1)} \\ \hat{B}_{(i+1)(j+1)} \\ \vdots \\ \hat{B}_{ndep,(j+1)} \end{bmatrix} \times \Delta \bar{I}_{(j+1)} \ldots + \begin{bmatrix} \hat{B}_{1,nind} \\ \vdots \\ \hat{B}_{(i-1),nind} \\ \hat{B}_{i,nind} \\ \hat{B}_{(i+1),nind} \\ \vdots \\ \hat{B}_{ndep,nind} \end{bmatrix} \times$$

$$\Delta \bar{I}_{nind} = \begin{bmatrix} I \\ \vdots \\ 0 \\ 0 \\ 0 \\ 0 \\ \vdots \\ 0 \end{bmatrix} \times \Delta \overline{O}_1 + \ldots + \begin{bmatrix} 0 \\ \vdots \\ I \\ 0 \\ 0 \\ 0 \\ \vdots \\ 0 \end{bmatrix} \times \Delta \overline{O}_{(i-1)} + \begin{bmatrix} 0 \\ \vdots \\ 0 \\ I \\ 0 \\ 0 \\ \vdots \\ 0 \end{bmatrix} \times$$

$$\Delta \bar{I}_j + \begin{bmatrix} 0 \\ \vdots \\ 0 \\ 0 \\ I \\ \vdots \\ 0 \end{bmatrix} \times \Delta \overline{O}_{(i+1)} + \ldots + \begin{bmatrix} 0 \\ \vdots \\ 0 \\ 0 \\ 0 \\ 0 \\ \vdots \\ I \end{bmatrix} \times \Delta \overline{O}_{ndep}$$

or reassembling the matrix equation we get;

$$\begin{bmatrix} \hat{B}_{1,1} & \cdots & \hat{B}_{1,(j-1)} & \hat{B}_{1,j} & \hat{B}_{1,(j+1)} & \cdots & \hat{B}_{1,nind} \\ \vdots & \ddots & \vdots & \vdots & \vdots & \ddots & \vdots \\ \hat{B}_{(i-1),1} & \cdots & \hat{B}_{(i-1),(j-1)} & \hat{B}_{(i-1),j} & \hat{B}_{(i-1),(j+1)} & \cdots & \hat{B}_{(i-1),nind} \\ \hat{B}_{i,1} & \cdots & \hat{B}_{i,(j-1)} & \hat{B}_{i,j} & \hat{B}_{i,(j+1)} & \cdots & \hat{B}_{i,nind} \\ \hat{B}_{(i+1),1} & \cdots & \hat{B}_{(i+1),(j-1)} & \hat{B}_{(i+1),j} & \hat{B}_{(i+1),(j+1)} & \cdots & \hat{B}_{(i+1),nind} \\ \vdots & \ddots & \vdots & \vdots & \vdots & \ddots & \vdots \\ \hat{B}_{ndep,1} & \cdots & \hat{B}_{ndep,(j-1)} & \hat{B}_{ndep,j} & \hat{B}_{ndep,(j+1)} & \cdots & \hat{B}_{ndep,nind} \end{bmatrix} \times \begin{bmatrix} \Delta \bar{I}_1 \\ \vdots \\ \Delta \bar{I}_{(j-1)} \\ \Delta \overline{O}_i \\ \Delta \bar{I}_{(j+1)} \\ \vdots \\ \Delta \bar{I}_{nind} \end{bmatrix} =$$

-continued $$\begin{bmatrix} I & \cdots & 0 & 0 & 0 & \cdots & 0 \\ \vdots & \ddots & \ddots & \ddots & \ddots & \ddots & \vdots \\ 0 & \ddots & I & 0 & 0 & \ddots & 0 \\ 0 & \ddots & 0 & I & 0 & \ddots & 0 \\ 0 & \ddots & 0 & 0 & I & \ddots & 0 \\ \vdots & \ddots & \ddots & \ddots & \ddots & \ddots & \vdots \\ 0 & \cdots & 0 & 0 & 0 & \cdots & I \end{bmatrix} \times \begin{bmatrix} \Delta \overline{O}_1 \\ \vdots \\ \Delta \overline{O}_{(i-1)} \\ \Delta \bar{I}_j \\ \Delta \overline{O}_{(i+1)} \\ \vdots \\ \Delta \overline{O}_{ndep} \end{bmatrix}$$

Note that $\Delta \overline{O}_i$ and $\Delta \bar{I}_j$ have been interchanged so that the final control element position is now an independent variable and the PID set point is now a dependent variable. This illustrates removing the PID dynamics from only one PID controller, but the algorithm is clearly general in that multiple independent/dependent variable pairs can be interchanged to remove the dynamics for multiple controllers.

By way of further illustration a numerical example problem will now be illustrated to show how this approach is applied to a model predictive controller to remove the dynamics of a particular PID controller.

Given an FIR model with two (2) independent variables, two (2) dependent variables and four (4) model coefficients, where the second independent variable is the set point of a PID controller and the second dependent variable is the final control element position of the PID controller, we wish to re-constitute the model with the PID final control element position as an independent variable instead of the PID set point. This requires that the dynamics of the PID controller be removed from all system responses according to the algorithm previously discussed. This example is also valid for the $\Delta O = B \Delta I_i$, $\delta O = B \Delta I$, and $\Delta \Delta O = B \Delta \Delta I$ forms of the equation.

| Independent Var-1 | Independent Var-2 |
|---|---|
| Dependent Var-1 | |
| $b_{1,1,1} = 1.5$ | $b_{1,2,1} = 0.5$ |
| $b_{1,1,2} = 0.6$ | $b_{1,2,2} = 0.4$ |
| $b_{1,1,3} = 0.2$ | $b_{1,2,3} = 0.2$ |
| $b_{1,1,4} = 0.1$ | $b_{1,2,4} = 0.1$ |
| Dependent Var-2 | |
| $b_{2,1,1} = -0.3$ | $b_{2,2,1} = 0.75$ |
| $b_{2,1,2} = -0.4$ | $b_{2,2,2} = 0.25$ |
| $b_{2,1,3} = -0.1$ | $b_{2,2,3} = 0.15$ |
| $b_{2,1,4} = -0.05$ | $b_{2,2,4} = 0.05$ |

The problem is specified in the matrix below.
Indicates Pivot Element

| 1.5   | 0    | 0    | 0    | 0.5  | 0    | 0    | 0    | 1 | 0 | 0 | 0 | 0 | 0 | 0 | 0 |
|-------|------|------|------|------|------|------|------|---|---|---|---|---|---|---|---|
| 0.6   | 1.5  | 0    | 0    | 0.4  | 0.5  | 0    | 0    | 0 | 1 | 0 | 0 | 0 | 0 | 0 | 0 |
| 0.2   | 0.6  | 1.5  | 0    | 0.2  | 0.4  | 0.5  | 0    | 0 | 0 | 1 | 0 | 0 | 0 | 0 | 0 |
| 0.1   | 0.2  | 0.6  | 1.5  | 0.1  | 0.2  | 0.4  | 0.5  | 0 | 0 | 0 | 1 | 0 | 0 | 0 | 0 |
| −0.3  | 0    | 0    | 0    | 0.75 | 0    | 0    | 0    | 0 | 0 | 0 | 0 | 1 | 0 | 0 | 0 |
| −0.4  | −0.3 | 0    | 0    | 0.25 | 0.75 | 0    | 0    | 0 | 0 | 0 | 0 | 0 | 1 | 0 | 0 |
| −0.1  | −0.4 | −0.3 | 0    | 0.15 | 0.25 | 0.75 | 0    | 0 | 0 | 0 | 0 | 0 | 0 | 1 | 0 |
| −0.05 | −0.1 | −0.4 | −0.3 | 0.05 | 0.15 | 0.25 | 0.75 | 0 | 0 | 0 | 0 | 0 | 0 | 0 | 1 |

Multiply Equation-5 by (−1/0.75)

| 1.5   | 0    | 0    | 0    | 0.5  | 0    | 0    | 0    | 1 | 0 | 0 | 0 | 0      | 0 | 0 | 0 |
|-------|------|------|------|------|------|------|------|---|---|---|---|--------|---|---|---|
| 0.6   | 1.5  | 0    | 0    | 0.4  | 0.5  | 0    | 0    | 0 | 1 | 0 | 0 | 0      | 0 | 0 | 0 |
| 0.2   | 0.6  | 1.5  | 0    | 0.2  | 0.4  | 0.5  | 0    | 0 | 0 | 1 | 0 | 0      | 0 | 0 | 0 |
| 0.1   | 0.2  | 0.6  | 1.5  | 0.1  | 0.2  | 0.4  | 0.5  | 0 | 0 | 0 | 1 | 0      | 0 | 0 | 0 |
| 0.4   | 0    | 0    | 0    | −1   | 0    | 0    | 0    | 0 | 0 | 0 | 0 | −1.333 | 0 | 0 | 0 |
| −0.4  | −0.3 | 0    | 0    | 0.25 | 0.75 | 0    | 0    | 0 | 0 | 0 | 0 | 0      | 1 | 0 | 0 |
| −0.1  | −0.4 | −0.3 | 0    | 0.15 | 0.25 | 0.75 | 0    | 0 | 0 | 0 | 0 | 0      | 0 | 1 | 0 |
| −0.05 | −0.1 | −0.4 | −0.3 | 0.05 | 0.15 | 0.25 | 0.75 | 0 | 0 | 0 | 0 | 0      | 0 | 0 | 1 |

Multiply Equation-5 by 0.5, add it to Equation-1 and replace Equation-1

Multiply Equation-5 by 0.4, add it to Equation-2 and replace Equation-2

Multiply Equation-5 by 0.2, add it to Equation-3 and replace Equation-3

Multiply Equation-5 by 0.1, add it to Equation-4 and replace Equation-4

Multiply Equation-5 by 0.25, add it to Equation-6 and replace Equation-6

Multiply Equation-5 by 0.15, add it to Equation-7 and replace Equation-7

Multiply Equation-5 by 0.05, add it to Equation-8 and replace Equation-8

Multiply Equation-5 by 0.4, add it to Equation-3 and replace Equation-3

Multiply Equation-5 by 0.2, add it to Equation-4 and replace Equation-4

Multiply Equation-5 by 0.25, add it to Equation-7 and replace Equation-7

Multiply Equation-5 by 0.15, add it to Equation-8 and replace Equation-8

| 1.7   | 0    | 0    | 0    | 0   | 0    | 0    | 0    | 1 | 0 | 0 | 0 | −0.667 | 0 | 0 | 0 |
|-------|------|------|------|-----|------|------|------|---|---|---|---|--------|---|---|---|
| 0.76  | 1.5  | 0    | 0    | 0   | 0.5  | 0    | 0    | 0 | 1 | 0 | 0 | −0.533 | 0 | 0 | 0 |
| 0.28  | 0.6  | 1.5  | 0    | 0   | 0.4  | 0.5  | 0    | 0 | 0 | 1 | 0 | −0.267 | 0 | 0 | 0 |
| 0.14  | 0.2  | 0.6  | 1.5  | 0   | 0.2  | 0.4  | 0.5  | 0 | 0 | 0 | 1 | −0.133 | 0 | 0 | 0 |
| 0.4   | 0    | 0    | 0    | −1  | 0    | 0    | 0    | 0 | 0 | 0 | 0 | −1.333 | 0 | 0 | 0 |
| −0.3  | −0.3 | 0    | 0    | 0   | 0.75 | 0    | 0    | 0 | 0 | 0 | 0 | −0.333 | 1 | 0 | 0 |
| −0.04 | −0.4 | −0.3 | 0    | 0   | 0.25 | 0.75 | 0    | 0 | 0 | 0 | 0 | −0.2   | 0 | 1 | 0 |
| −0.03 | −0.1 | −0.4 | −0.3 | 0   | 0.15 | 0.25 | 0.75 | 0 | 0 | 0 | 0 | −0.067 | 0 | 0 | 1 |

Multiply Equation-6 by (−1/0.75)

| 1.7   | 0    | 0    | 0    | 0   | 0    | 0    | 0    | 1 | 0 | 0 | 0 | −0.667 | 0      | 0 | 0 |
|-------|------|------|------|-----|------|------|------|---|---|---|---|--------|--------|---|---|
| 0.76  | 1.5  | 0    | 0    | 0   | 0.5  | 0    | 0    | 0 | 1 | 0 | 0 | −0.533 | 0      | 0 | 0 |
| 0.28  | 0.6  | 1.5  | 0    | 0   | 0.4  | 0.5  | 0    | 0 | 0 | 1 | 0 | −0.267 | 0      | 0 | 0 |
| 0.14  | 0.2  | 0.6  | 1.5  | 0   | 0.2  | 0.4  | 0.5  | 0 | 0 | 0 | 1 | −0.133 | 0      | 0 | 0 |
| 0.4   | 0    | 0    | 0    | −1  | 0    | 0    | 0    | 0 | 0 | 0 | 0 | −1.333 | 0      | 0 | 0 |
| 0.4   | 0.4  | 0    | 0    | 0   | −1   | 0    | 0    | 0 | 0 | 0 | 0 | 0.444  | −1.333 | 0 | 0 |
| −0.04 | −0.4 | −0.3 | 0    | 0   | 0.25 | 0.75 | 0    | 0 | 0 | 0 | 0 | −0.2   | 0      | 1 | 0 |
| −0.03 | −0.1 | −0.4 | −0.3 | 0   | 0.15 | 0.25 | 0.75 | 0 | 0 | 0 | 0 | −0.067 | 0      | 0 | 1 |

Multiply Equation-5 by 0.5, add it to Equation-2 and replace Equation-2

| | | | | | | | | | | | | | | | |
|---|---|---|---|---|---|---|---|---|---|---|---|---|---|---|---|
| 1.7 | 0 | 0 | 0 | 0 | 0 | 0 | 0 | 1 | 0 | 0 | 0 | −0.667 | 0 | 0 | 0 |
| 0.96 | 1.7 | 0 | 0 | 0 | 0 | 0 | 0 | 0 | 1 | 0 | 0 | −0.311 | −0.667 | 0 | 0 |
| 0.44 | 0.76 | 1.5 | 0 | 0 | 0 | 0.5 | 0 | 0 | 0 | 1 | 0 | −0.089 | −0.533 | 0 | 0 |
| 0.22 | 0.28 | 0.6 | 1.5 | 0 | 0 | 0.4 | 0.5 | 0 | 0 | 0 | 1 | −0.044 | −0.267 | 0 | 0 |
| 0.4 | 0 | 0 | 0 | −1 | 0 | 0 | 0 | 0 | 0 | 0 | 0 | −1.333 | 0 | 0 | 0 |
| 0.4 | 0.4 | 0 | 0 | 0 | −1 | 0 | 0 | 0 | 0 | 0 | 0 | 0.444 | −1.333 | 0 | 0 |
| 0.06 | −0.3 | −0.3 | 0 | 0 | 0 | 0.75 | 0 | 0 | 0 | 0 | 0 | −0.089 | −0.333 | 1 | 0 |
| 0.03 | −0.04 | −0.4 | −0.3 | 0 | 0 | 0.25 | 0.75 | 0 | 0 | 0 | 0 | 0 | −0.2 | 0 | 1 |

Multiply Equation-7 by (−1/0.75)

| | | | | | | | | | | | | | | | |
|---|---|---|---|---|---|---|---|---|---|---|---|---|---|---|---|
| 1.7 | 0 | 0 | 0 | 0 | 0 | 0 | 0 | 1 | 0 | 0 | 0 | −0.667 | 0 | 0 | 0 |
| 0.96 | 1.7 | 0 | 0 | 0 | 0 | 0 | 0 | 0 | 1 | 0 | 0 | −0.311 | −0.667 | 0 | 0 |
| 0.44 | 0.76 | 1.5 | 0 | 0 | 0 | 0.5 | 0 | 0 | 0 | 1 | 0 | −0.089 | −0.533 | 0 | 0 |
| 0.22 | 0.28 | 0.6 | 1.5 | 0 | 0 | 0.4 | 0.5 | 0 | 0 | 0 | 1 | −0.044 | −0.267 | 0 | 0 |
| 0.4 | 0 | 0 | 0 | −1 | 0 | 0 | 0 | 0 | 0 | 0 | 0 | −1.333 | 0 | 0 | 0 |
| 0.4 | 0.4 | 0 | 0 | 0 | −1 | 0 | 0 | 0 | 0 | 0 | 0 | 0.444 | −1.333 | 0 | 0 |
| −0.08 | 0.4 | 0.4 | 0 | 0 | 0 | −1 | 0 | 0 | 0 | 0 | 0 | 0.119 | 0.4444 | −1.333 | 0 |
| 0.03 | −0.04 | −0.4 | −0.3 | 0 | 0 | 0.25 | 0.75 | 0 | 0 | 0 | 0 | 0 | −0.2 | 0 | 1 |

Multiply Equation-5 by 0.5, add it to Equation-3 and replace Equation-3
Multiply Equation-5 by 0.4, add it to Equation-4 and replace Equation-4
Multiply Equation-5 by 0.25, add it to Equation-8 and replace Equation-8

| | | | | | | | | | | | | | | | |
|---|---|---|---|---|---|---|---|---|---|---|---|---|---|---|---|
| 1.7 | 0 | 0 | 0 | 0 | 0 | 0 | 0 | 1 | 0 | 0 | 0 | −0.667 | 0 | 0 | 0 |
| 0.96 | 1.7 | 0 | 0 | 0 | 0 | 0 | 0 | 0 | 1 | 0 | 0 | −0.311 | −0.667 | 0 | 0 |
| 0.4 | 0.96 | 1.7 | 0 | 0 | 0 | 0 | 0 | 0 | 0 | 1 | 0 | −0.030 | −0.311 | −0.667 | 0 |
| 0.188 | 0.44 | 0.76 | 1.5 | 0 | 0 | 0 | 0.5 | 0 | 0 | 0 | 1 | 0.003 | −0.089 | −0.533 | 0 |
| 0.4 | 0 | 0 | 0 | −1 | 0 | 0 | 0 | 0 | 0 | 0 | 0 | −1.333 | 0 | 0 | 0 |
| 0.4 | 0.4 | 0 | 0 | 0 | −1 | 0 | 0 | 0 | 0 | 0 | 0 | 0.444 | −1.333 | 0 | 0 |
| −0.08 | 0.4 | 0.4 | 0 | 0 | 0 | −1 | 0 | 0 | 0 | 0 | 0 | 0.119 | 0.444 | −1.333 | 0 |
| 0.01 | 0.06 | −0.3 | −0.3 | 0 | 0 | 0 | 0.75 | 0 | 0 | 0 | 0 | 0.030 | −0.089 | −0.333 | 1 |

Multiply Equation-8 by (−1/0.75)

| | | | | | | | | | | | | | | | |
|---|---|---|---|---|---|---|---|---|---|---|---|---|---|---|---|
| 1.7 | 0 | 0 | 0 | 0 | 0 | 0 | 0 | 1 | 0 | 0 | 0 | −0.667 | 0 | 0 | 0 |
| 0.96 | 1.7 | 0 | 0 | 0 | 0 | 0 | 0 | 0 | 1 | 0 | 0 | −0.311 | −0.667 | 0 | 0 |
| 0.4 | 0.96 | 1.7 | 0 | 0 | 0 | 0 | 0 | 0 | 0 | 1 | 0 | −0.030 | −0.311 | −0.667 | 0 |
| 0.188 | 0.44 | 0.76 | 1.5 | 0 | 0 | 0 | 0.5 | 0 | 0 | 0 | 1 | 0.003 | −0.089 | −0.533 | 0 |
| 0.4 | 0 | 0 | 0 | −1 | 0 | 0 | 0 | 0 | 0 | 0 | 0 | −1.333 | 0 | 0 | 0 |
| 0.4 | 0.4 | 0 | 0 | 0 | −1 | 0 | 0 | 0 | 0 | 0 | 0 | 0.444 | −1.333 | 0 | 0 |
| −0.08 | 0.4 | 0.4 | 0 | 0 | 0 | −1 | 0 | 0 | 0 | 0 | 0 | 0.119 | 0.444 | −1.333 | 0 |
| −0.013 | −0.08 | 0.4 | 0.4 | 0 | 0 | 0 | −1 | 0 | 0 | 0 | 0 | −0.040 | 0.119 | 0.444 | −1.333 |

Multiply Equation-5 by 0.5, add it to Equation-4 and replace Equation-4

| | | | | | | | | | | | | | | | |
|---|---|---|---|---|---|---|---|---|---|---|---|---|---|---|---|
| 1.7 | 0 | 0 | 0 | 0 | 0 | 0 | 0 | 1 | 0 | 0 | 0 | −0.667 | 0 | 0 | 0 |
| 0.96 | 1.7 | 0 | 0 | 0 | 0 | 0 | 0 | 0 | 1 | 0 | 0 | −0.311 | −0.667 | 0 | 0 |
| 0.4 | 0.96 | 1.7 | 0 | 0 | 0 | 0 | 0 | 0 | 0 | 1 | 0 | −0.030 | −0.311 | −0.667 | 0 |
| 0.181 | 0.4 | 0.96 | 1.7 | 0 | 0 | 0 | 0 | 0 | 0 | 0 | 1 | −0.017 | −0.030 | −0.311 | −0.667 |
| 0.4 | 0 | 0 | 0 | −1 | 0 | 0 | 0 | 0 | 0 | 0 | 0 | −1.333 | 0 | 0 | 0 |

-continued

| | | | | | | | | | | | | | | | |
|---|---|---|---|---|---|---|---|---|---|---|---|---|---|---|---|
| 0.4 | 0.4 | 0 | 0 | 0 | −1 | 0 | 0 | 0 | 0 | 0 | 0 | 0.444 | −1.333 | 0 | 0 |
| −0.08 | 0.4 | 0.4 | 0 | 0 | 0 | −1 | 0 | 0 | 0 | 0 | 0 | 0.119 | 0.444 | −1.333 | 0 |
| −0.013 | −0.08 | 0.4 | 0.4 | 0 | 0 | 0 | −1 | 0 | 0 | 0 | 0 | −0.040 | 0.119 | 0.444 | −1.333 |

Rearrange Equations

| | | | | | | | | | | | | | | | |
|---|---|---|---|---|---|---|---|---|---|---|---|---|---|---|---|
| 1.7 | 0 | 0 | 0 | 0.667 | 0 | 0 | 0 | 1 | 0 | 0 | 0 | 0 | 0 | 0 | 0 |
| 0.96 | 1.7 | 0 | 0 | 0.311 | 0.667 | 0 | 0 | 0 | 1 | 0 | 0 | 0 | 0 | 0 | 0 |
| 0.4 | 0.96 | 1.7 | 0 | 0.030 | 0.311 | 0.667 | 0 | 0 | 0 | 1 | 0 | 0 | 0 | 0 | 0 |
| 0.181 | 0.4 | 0.96 | 1.7 | 0.017 | 0.030 | 0.311 | 0.667 | 0 | 0 | 0 | 1 | 0 | 0 | 0 | 0 |
| 0.4 | 0 | 0 | 0 | 1.333 | 0 | 0 | 0 | 0 | 0 | 0 | 0 | 1 | 0 | 0 | 0 |
| 0.4 | 0.4 | 0 | 0 | −0.444 | 1.333 | 0 | 0 | 0 | 0 | 0 | 0 | 0 | 1 | 0 | 0 |
| −0.08 | 0.4 | 0.4 | 0 | −0.119 | −0.444 | 1.333 | 0 | 0 | 0 | 0 | 0 | 0 | 0 | 1 | 0 |

The new model coefficients with the PID dynamics removed are as follows:

| Independent Var-1 | Independent Var-2 |
|---|---|
| Dependent Var-1 | |
| $b_{1,1,1} = 1.7$ | $b_{1,2,1} = 0.667$ |
| $b_{1,1,2} = 0.96$ | $b_{1,2,2} = 0.311$ |
| $b_{1,1,3} = 0.4$ | $b_{1,2,3} = 0.030$ |
| $b_{1,1,4} = 0.181$ | $b_{1,2,4} = 0.017$ |
| Dependent Var-2 | |
| $b_{2,1,1} = 0.4$ | $b_{2,2,1} = 1.333$ |
| $b_{2,1,2} = 0.4$ | $b_{2,2,2} = -0.444$ |
| $b_{2,1,3} = -0.08$ | $b_{2,2,3} = -0.119$ |
| $b_{2,1,4} = -0.0133$ | $b_{2,2,4} = 0.040$ |

Note that all the coefficient values changed. This new controller now has the dynamics of the second independent variable (a PID set point) removed. This controller can now be used to control the process and the development of this controller was done off line without having to do an additional time consuming expensive identification test on the process.

The same methodology has been derived to remove the PID dynamics from the open loop step response form of the equation. It is shown in application Ser. No. 10/043,473 by the inventor and will not be repeated here.

COLUMN SIMULATION EXAMPLE

An example use of the algorithm is demonstrated in the following example. This example will illustrate the following:

The use of a final control element-based Finite Impulse Response (FIR) model as a process simulator for use as an on-line advisor or off-line training simulator.

Plant step-test and Identification of an FIR model based on a specific regulatory control configuration.

Use of the proposed algorithm to remove the PID controller dynamics and recover the underlying final control element-based model.

In this example, an FIR model based on valve positions is used as the process model to simulate the behavior of a complex fractionator. The regulatory control for the fractionator consists of three PI (proportional/integral) feedback controllers. A plant step test is performed on the simulation using the regulatory controller set points. An FIR model is then obtained for the fractionator based on the set points of the PI controllers. This model based on the regulatory control scheme is then input to the algorithm to remove the PI controller dynamics and recover the original FIR process model.

It should be noted that the term Finite Impulse Response (FIR) model is used to refer to the open-loop step response form of the models, since the step form could be directly calculated from the impulse coefficients.

Description of Complex Fractionator Schematic

The schematic for the Complex Fractionator is shown in FIG. 1. The feed flow rate 5 is controlled by the upstream unit and is pre-heated in a furnace 6. The fractionator 7 has a top, middle and bottom product. The fractionator overhead temperature is controlled with a PI controller 8 moving the top reflux. The middle product draw temperature is controlled with a PI controller 9 moving the middle product draw rate. A third PI controller 10 moves the bottom product rate to control the fractionator bottoms level. The bottom composition (light component) is measured with an analyzer 11.

Description of Finite Impulse Response (FIR) Model

The process model used in this example is an open-loop, step response model based on the valve positions, summarized as follows:

Model Independent Variables
TIC-2001.OP—Top Reflux Flow Valve
TIC-2002.OP—Middle Product Flow Valve
LIC-2007.OP—Bottoms Product Flow Valve
FIC-2004.SP—Middle Reflux Flow Rate
FI-2005.PV—Fractionator Feed Rate Model Dependent Variables
TIC-2001.PV—Fractionator Overhead Temperature
TIC-2002.PV—Middle Product Draw Temperature
LIC-2007.PV—Fractionator Bottoms Level
Al-2022.PV—Fractionator Bottoms Composition (Light Component)

The open-loop step response model can be viewed in an idealized sense as being generated as follows. With the system at steady state, the first independent variables is increased by one engineering unit at time=0 while holding all other independent variables constant. The values for all dependent variables are then measured at equally spaced time intervals until the system reaches steady state again. The model response curves for each dependent variable with respect to the first independent variable are then calculated by subtracting the value of the dependent variable at time=0 from each of the measured values at each future time interval for that dependent variables. Essentially, a step response curve represents the effect on the dependent variable of a change in the independent variable. This process is then repeated successively for all the independent variables to generate the full model. The steady state time for the model is defined by the steady state time of the slowest response curve in the system.

Clearly in the real world, the model cannot be generated in this fashion since often the process is not at steady state. Further, it is impossible to prevent measured and unmeasured disturbances from affecting the system during an independent variable step. Generation of the model requires that multiple steps be made in each independent variable (plant step test). The data thus collected is then analyzed with a software package such as AspenTech's DMCplus Model program to calculate the open-loop step response model.

Once such a model has been identified, it can be used to predict future system response based on past changes in the independent variables. That is to say, if we know how all independent variables have changed for one steady-state time into the past, we can use the model to predict how the dependent variables will change for one steady-state time into the future, assuming no further independent variable changes. This illustrates the use of the model for Prediction. (This is the basis for using an FIR model as a process simulator).

Given the predicted future system response based on no further independent variable changes and given the constraints on all independent and dependent variables, the model can be used to plan a strategy of independent variable moves to keep all independent and dependent variables within constraints. This illustrates the use of the model for Control.

Using a Finite Impulse Response (FIR) Model as a Process Simulator

The model for this example has a steady state time of ninety (90) minutes. A three (3) minute time interval is used. The resulting response curves are each defined by a vector of thirty (30) numbers representing the accumulative change in that dependent variable across time with respect to a step change in the independent variable at time=0 while holding all other independent variables constant.

Figure 2:
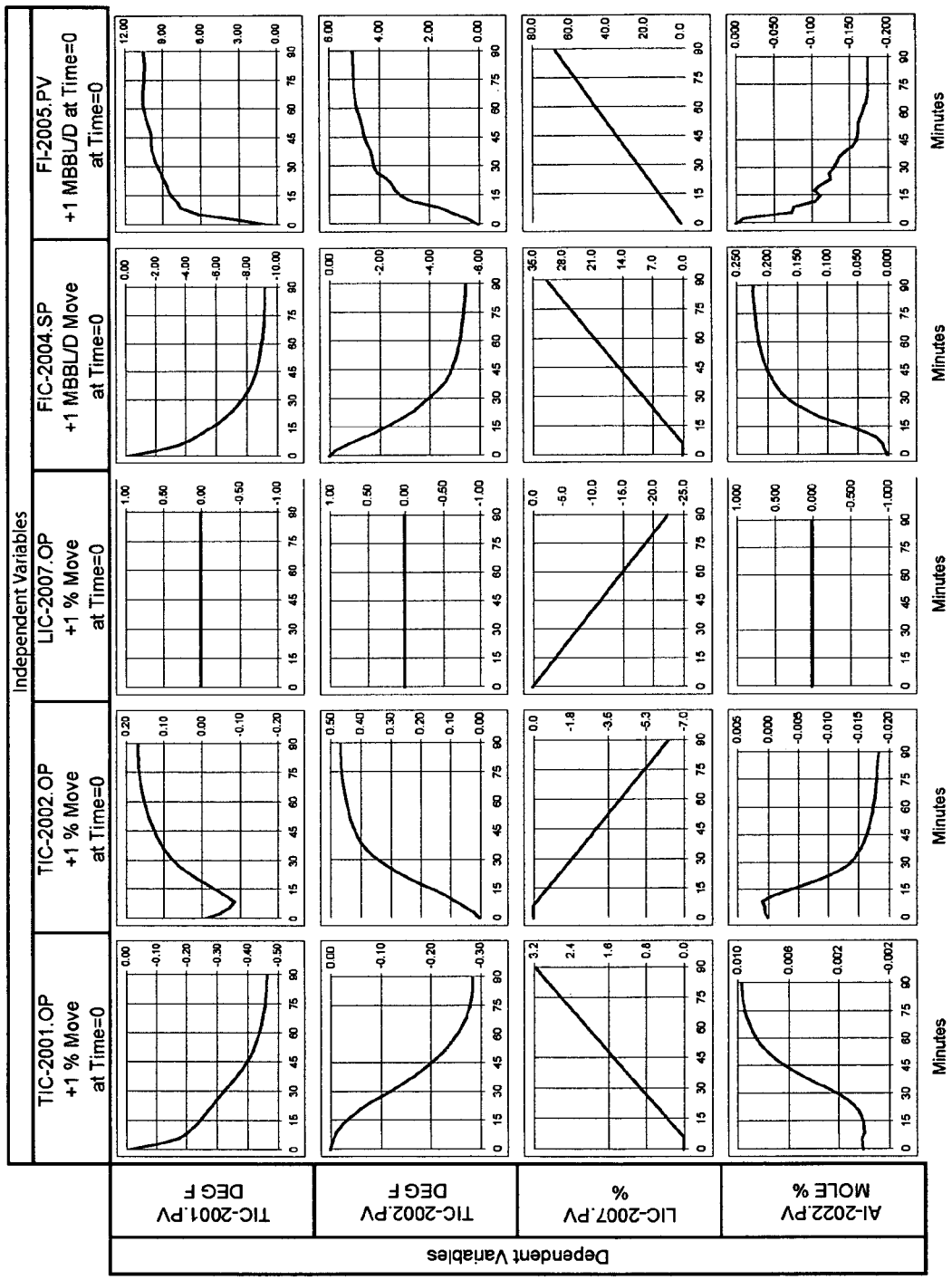
FIG. 2 is a simulation of the fractionator model based on valve positions

The model coefficients are shown in Table 1 and the model plots are shown in FIG. 2. This model, based on valve positions, is used to predict future system behavior in the model dependent variables based on past and present changes in the model independent variables.

TABLE 1

Fractionator Simulation Valve-based Model Coefficients

| Minutes | TIC-2001.OP + 1% Move at Time = 0 | TIC-2002.OP + 1% Move at Time = 0 | LIC-2007.OP + 1% Move at Time = 0 | FIC-2004.SP + 1 MBBL/D Move at Time = 0 | FI-2005.PV + 1 MBBL/D Move at Time = 0 |
|---|---|---|---|---|---|
| Step Response Coefficients for Dependent Variable-1: TIC-2001.PV DEG F. | | | | | |
| 0 | 0.000 | 0.000 | 0.0 | 0.00 | 0.0 |
| 3 | −0.101 | −0.048 | 0.0 | −2.05 | 2.9 |
| 6 | −0.175 | −0.076 | 0.0 | −3.58 | 6.1 |
| 9 | −0.206 | −0.088 | 0.0 | −4.43 | 7.5 |
| 12 | −0.227 | −0.068 | 0.0 | −5.03 | 7.8 |
| 15 | −0.245 | −0.040 | 0.0 | −5.58 | 8.2 |
| 18 | −0.262 | −0.015 | 0.0 | −6.16 | 8.5 |
| 21 | −0.277 | 0.010 | 0.0 | −6.65 | 8.6 |
| 24 | −0.292 | 0.033 | 0.0 | −7.04 | 8.9 |
| 27 | −0.306 | 0.054 | 0.0 | −7.37 | 9.0 |
| 30 | −0.323 | 0.069 | 0.0 | −7.67 | 9.3 |
| 33 | −0.340 | 0.084 | 0.0 | −7.95 | 9.5 |
| 36 | −0.356 | 0.096 | 0.0 | −8.18 | 9.6 |
| 39 | −0.372 | 0.105 | 0.0 | −8.37 | 9.8 |
| 42 | −0.386 | 0.113 | 0.0 | −8.52 | 9.8 |
| 45 | −0.399 | 0.121 | 0.0 | −8.65 | 9.8 |
| 48 | −0.410 | 0.128 | 0.0 | −8.75 | 9.9 |
| 51 | −0.420 | 0.135 | 0.0 | −8.84 | 10.0 |
| 54 | −0.428 | 0.140 | 0.0 | −8.92 | 10.1 |
| 57 | −0.435 | 0.145 | 0.0 | −8.98 | 10.3 |
| 60 | −0.440 | 0.149 | 0.0 | −9.04 | 10.4 |
| 63 | −0.445 | 0.153 | 0.0 | −9.09 | 10.5 |
| 66 | −0.450 | 0.156 | 0.0 | −9.13 | 10.5 |
| 69 | −0.453 | 0.159 | 0.0 | −9.17 | 10.5 |
| 72 | −0.457 | 0.161 | 0.0 | −9.21 | 10.5 |
| 75 | −0.460 | 0.163 | 0.0 | −9.24 | 10.4 |
| 78 | −0.462 | 0.165 | 0.0 | −9.26 | 10.4 |
| 81 | −0.464 | 0.166 | 0.0 | −9.28 | 10.4 |
| 84 | −0.465 | 0.167 | 0.0 | −9.29 | 10.4 |
| 87 | −0.466 | 0.167 | 0.0 | −9.29 | 10.4 |
| 90 | −0.466 | 0.167 | 0.0 | −9.29 | 10.5 |
| Step Response Coefficients for Dependent Variable-2: TIC-2002.PV DEG F. | | | | | |
| 0 | 0.000 | 0.000 | 0.0 | 0.00 | 0.00 |
| 3 | −0.002 | 0.020 | 0.0 | −0.28 | 0.46 |
| 6 | −0.008 | 0.052 | 0.0 | −0.73 | 1.06 |
| 9 | −0.012 | 0.081 | 0.0 | −1.26 | 1.62 |
| 12 | −0.021 | 0.118 | 0.0 | −1.77 | 2.63 |
| 15 | −0.032 | 0.157 | 0.0 | −2.23 | 3.12 |
| 18 | −0.046 | 0.201 | 0.0 | −2.64 | 3.34 |

TABLE 1-continued

Fractionator Simulation Valve-based Model Coefficients

| Minutes | TIC-2001.OP + 1% Move at Time = 0 | TIC-2002.OP + 1% Move at Time = 0 | LIC-2007.OP + 1% Move at Time = 0 | FIC-2004.SP + 1 MBBL/D Move at Time = 0 | FI-2005.PV + 1 MBBL/D Move at Time = 0 |
|---|---|---|---|---|---|
| 21 | −0.061 | 0.242 | 0.0 | −3.06 | 3.50 |
| 24 | −0.077 | 0.277 | 0.0 | −3.40 | 3.69 |
| 27 | −0.097 | 0.308 | 0.0 | −3.67 | 4.05 |
| 30 | −0.117 | 0.335 | 0.0 | −3.93 | 4.18 |
| 33 | −0.136 | 0.360 | 0.0 | −4.19 | 4.22 |
| 36 | −0.153 | 0.380 | 0.0 | −4.42 | 4.26 |
| 39 | −0.170 | 0.396 | 0.0 | −4.62 | 4.33 |
| 42 | −0.186 | 0.407 | 0.0 | −4.78 | 4.46 |
| 45 | −0.201 | 0.416 | 0.0 | −4.90 | 4.55 |
| 48 | −0.214 | 0.423 | 0.0 | −4.99 | 4.61 |
| 51 | −0.225 | 0.430 | 0.0 | −5.07 | 4.64 |
| 54 | −0.236 | 0.436 | 0.0 | −5.13 | 4.70 |
| 57 | −0.245 | 0.440 | 0.0 | −5.19 | 4.77 |
| 60 | −0.253 | 0.445 | 0.0 | −5.23 | 4.85 |
| 63 | −0.260 | 0.449 | 0.0 | −5.27 | 4.90 |
| 66 | −0.266 | 0.452 | 0.0 | −5.30 | 4.94 |
| 69 | −0.272 | 0.455 | 0.0 | −5.33 | 4.96 |
| 72 | −0.276 | 0.458 | 0.0 | −5.36 | 4.98 |
| 75 | −0.279 | 0.460 | 0.0 | −5.38 | 4.98 |
| 78 | −0.282 | 0.462 | 0.0 | −5.40 | 4.99 |
| 81 | −0.284 | 0.463 | 0.0 | −5.42 | 5.00 |
| 84 | −0.285 | 0.464 | 0.0 | −5.44 | 5.01 |
| 87 | −0.285 | 0.465 | 0.0 | −5.45 | 5.02 |
| 90 | −0.285 | 0.465 | 0.0 | −5.46 | 5.04 |
| Step Response Coefficients for Dependent Variable-3: LIC-2001.PV % | | | | | |
| 0 | 0.00 | 0.00 | 0.0 | 0.0 | 0.0 |
| 3 | 0.00 | 0.00 | −0.8 | 0.0 | 2.3 |
| 6 | 0.00 | 0.00 | −1.5 | 0.0 | 4.5 |
| 9 | 0.11 | −0.23 | −2.3 | 1.1 | 6.8 |
| 12 | 0.23 | −0.45 | −3.0 | 2.3 | 9.0 |
| 15 | 0.34 | −0.68 | −3.8 | 3.4 | 11.3 |
| 18 | 0.45 | −0.90 | −4.5 | 4.5 | 13.5 |
| 21 | 0.56 | −1.13 | −5.3 | 5.6 | 15.8 |
| 24 | 0.68 | −1.35 | −6.0 | 6.8 | 18.0 |
| 27 | 0.79 | −1.58 | −6.8 | 7.9 | 20.3 |
| 30 | 0.90 | −1.80 | −7.5 | 9.0 | 22.5 |
| 33 | 1.01 | −2.03 | −8.3 | 10.1 | 24.8 |
| 36 | 1.13 | −2.25 | −9.0 | 11.3 | 27.0 |
| 39 | 1.24 | −2.48 | −9.8 | 12.4 | 29.3 |
| 42 | 1.35 | −2.70 | −10.5 | 13.5 | 31.5 |
| 45 | 1.46 | −2.93 | −11.3 | 14.6 | 33.8 |
| 48 | 1.58 | −3.15 | −12.0 | 15.8 | 36.0 |
| 51 | 1.69 | −3.38 | −12.8 | 16.9 | 38.3 |
| 54 | 1.80 | −3.60 | −13.5 | 18.0 | 40.5 |
| 57 | 1.91 | −3.83 | −14.3 | 19.1 | 42.8 |
| 60 | 2.03 | −4.05 | −15.0 | 20.3 | 45.0 |
| 63 | 2.14 | −4.28 | −15.8 | 21.4 | 47.3 |
| 66 | 2.25 | −4.50 | −16.5 | 22.5 | 49.5 |
| 69 | 2.36 | −4.73 | −17.3 | 23.6 | 51.8 |
| 72 | 2.48 | −4.95 | −18.0 | 24.8 | 54.0 |
| 75 | 2.59 | −5.18 | −18.8 | 25.9 | 56.3 |
| 78 | 2.70 | −5.40 | −19.5 | 27.0 | 58.5 |
| 81 | 2.81 | −5.63 | −20.3 | 28.1 | 60.8 |
| 84 | 2.93 | −5.85 | −21.0 | 29.3 | 63.0 |
| 87 | 3.04 | −6.08 | −21.8 | 30.4 | 65.3 |
| 90 | 3.15 | −6.30 | −22.5 | 31.5 | 67.5 |
| Step Response Coefficients for Dependent Variable-4: AI-2022.PV MOLE % | | | | | |
| 0 | 0.00000 | 0.0000 | 0.0 | 0.000 | 0.000 |
| 3 | 0.00004 | 0.0004 | 0.0 | 0.004 | −0.010 |
| 6 | 0.00010 | 0.0005 | 0.0 | 0.008 | −0.073 |
| 9 | −0.00014 | 0.0008 | 0.0 | 0.017 | −0.076 |
| 12 | −0.00006 | −0.0007 | 0.0 | 0.037 | −0.105 |
| 15 | −0.00003 | −0.0034 | 0.0 | 0.060 | −0.112 |
| 18 | 0.00013 | −0.0062 | 0.0 | 0.090 | −0.104 |
| 21 | 0.00033 | −0.0087 | 0.0 | 0.114 | −0.113 |
| 24 | 0.00075 | −0.0109 | 0.0 | 0.134 | −0.126 |
| 27 | 0.00125 | −0.0125 | 0.0 | 0.152 | −0.124 |
| 30 | 0.00193 | −0.0137 | 0.0 | 0.165 | −0.130 |
| 33 | 0.00277 | −0.0145 | 0.0 | 0.175 | −0.134 |
| 36 | 0.00368 | −0.0151 | 0.0 | 0.183 | −0.137 |
| 39 | 0.00459 | −0.0157 | 0.0 | 0.189 | −0.144 |

TABLE 1-continued

Fractionator Simulation Valve-based Model Coefficients

| Minutes | TIC-2001.OP + 1% Move at Time = 0 | TIC-2002.OP + 1% Move at Time = 0 | LIC-2007.OP + 1% Move at Time = 0 | FIC-2004.SP + 1 MBBL/D Move at Time = 0 | FI-2005.PV + 1 MBBL/D Move at Time = 0 |
|---|---|---|---|---|---|
| 42 | 0.00542 | −0.0161 | 0.0 | 0.194 | −0.154 |
| 45 | 0.00615 | −0.0164 | 0.0 | 0.199 | −0.161 |
| 48 | 0.00679 | −0.0167 | 0.0 | 0.203 | −0.162 |
| 51 | 0.00733 | −0.0170 | 0.0 | 0.206 | −0.162 |
| 54 | 0.00778 | −0.0172 | 0.0 | 0.208 | −0.163 |
| 57 | 0.00815 | −0.0174 | 0.0 | 0.211 | −0.165 |
| 60 | 0.00846 | −0.0175 | 0.0 | 0.213 | −0.168 |
| 63 | 0.00872 | −0.0177 | 0.0 | 0.214 | −0.171 |
| 66 | 0.00893 | −0.0178 | 0.0 | 0.216 | −0.173 |
| 69 | 0.00911 | −0.0179 | 0.0 | 0.217 | −0.175 |
| 72 | 0.00926 | −0.0180 | 0.0 | 0.218 | −0.176 |
| 75 | 0.00938 | −0.0181 | 0.0 | 0.219 | −0.176 |
| 78 | 0.00948 | −0.0182 | 0.0 | 0.220 | −0.175 |
| 81 | 0.00956 | −0.0182 | 0.0 | 0.221 | −0.175 |
| 84 | 0.00962 | −0.0183 | 0.0 | 0.222 | −0.175 |
| 87 | 0.00966 | −0.0184 | 0.0 | 0.222 | −0.175 |
| 90 | 0.00967 | −0.0185 | 0.0 | 0.223 | −0.175 |

As mentioned above, there are three Pi (Proportional/Integral) controllers in the system. These Pi controllers are configured as follows:

TABLE 2

Fractionator PID Controllers

| PID Loop Name | Set Point | Process Variable | Output | $K_p$ | $K_i$ |
|---|---|---|---|---|---|
| Top Temperature | TIC-2001.SP | TIC-2001.PV | TIC-2001.OP | −2.0 | 3.0 |
| Middle Product Draw Temperature | TIC-2002.SP | TIC-2002.PV | TIC-2002.OP | 3.0 | 8.0 |
| Bottoms Level | LIC-2001.SP | LIC-2001.PV | LIC-2007.OP | −1.0 | 4.0 |

Figure 3:
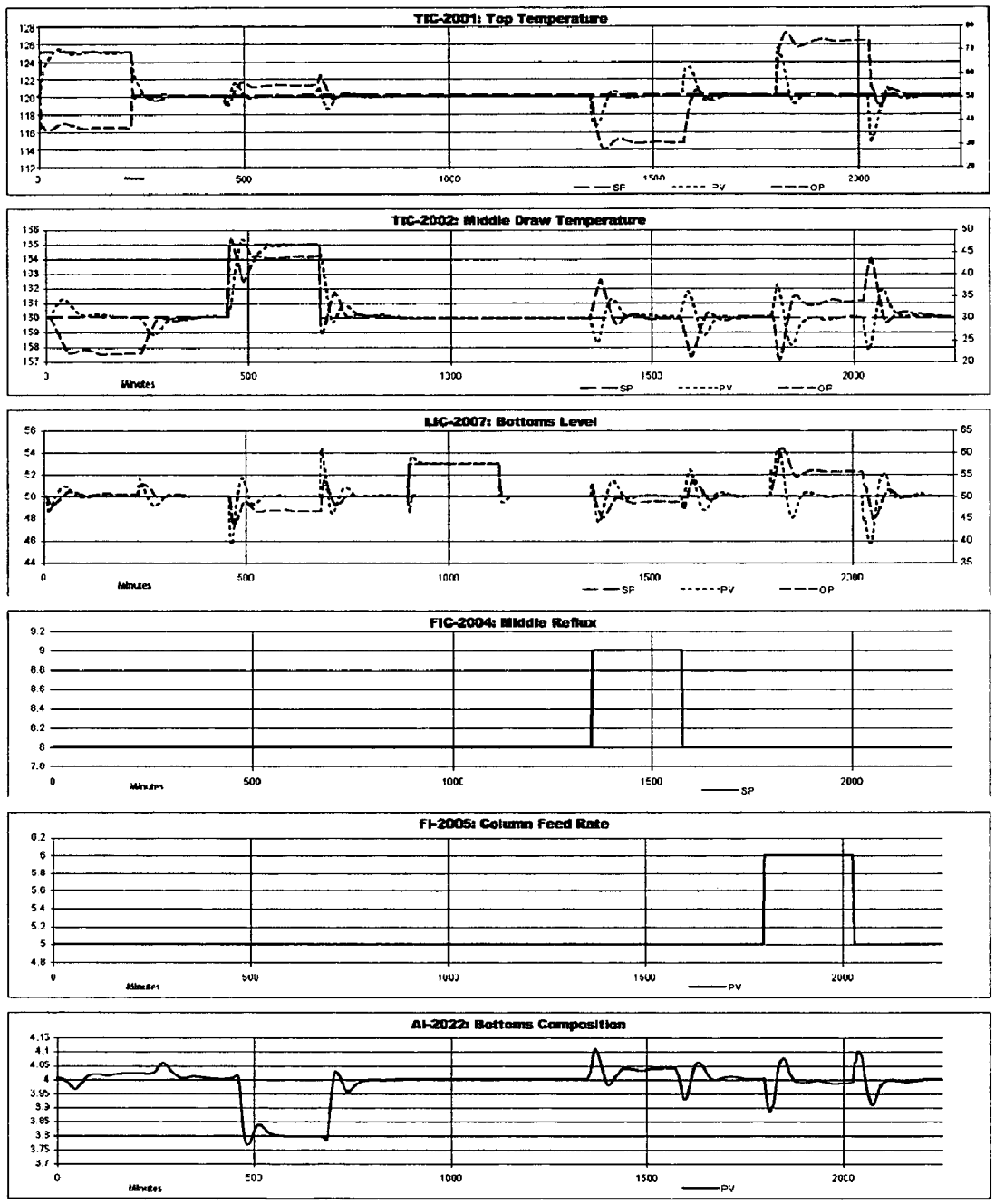
FIG. 3 demonstrates the results from a plant test of the fractionator

A plant test was performed (data plots in FIG. 3) with these Pi controllers regulating the process. The independent and dependent variables for the system were as follows:

Model Independent Variables
TIC-2001.SP—Top Reflux Flow Valve SP
TIC-2002.SP—Middle Product Flow Valve SP
LIC-2007.SP—Bottoms Product Flow Valve SP
FIC-2004.SP—Middle Reflux Flow Rate
FI-2005.PV—Fractionator Feed Rate Model Dependent Variables
TIC-2001.PV—Fractionator Overhead Temperature
TIC-2002.PV—Middle Product Draw Temperature
LIC-2007.PV—Fractionator Bottoms Level
TIC-2001.OP—Top Reflux Flow Valve
TIC-2002.OP—Middle Product Flow Valve
LIC-2007.OP—Bottoms Product Flow Valve
AI-2022.PV—Fractionator Bottoms Composition (Light Component)

This illustrates the use of a final control element-based FIR model as a process simulator. As described above, the PID control calculations were performed external to the process simulation.

Figure 4:
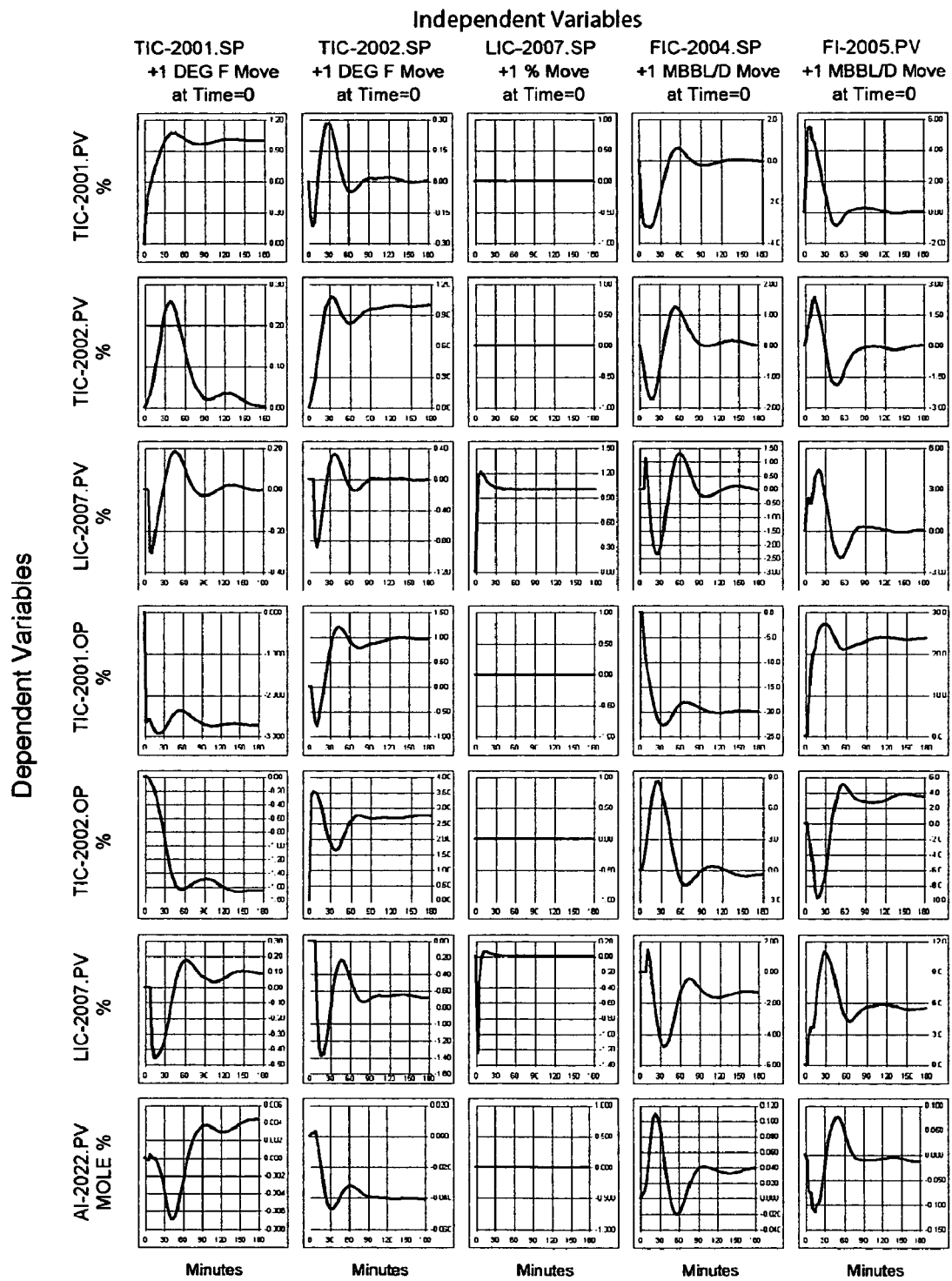
FIG. 4 is a simulation of the fractionator with the PID controllers

The resulting data were analyzed and a model based on this PID configuration was identified, as shown in FIG. 4.

Figure 5:
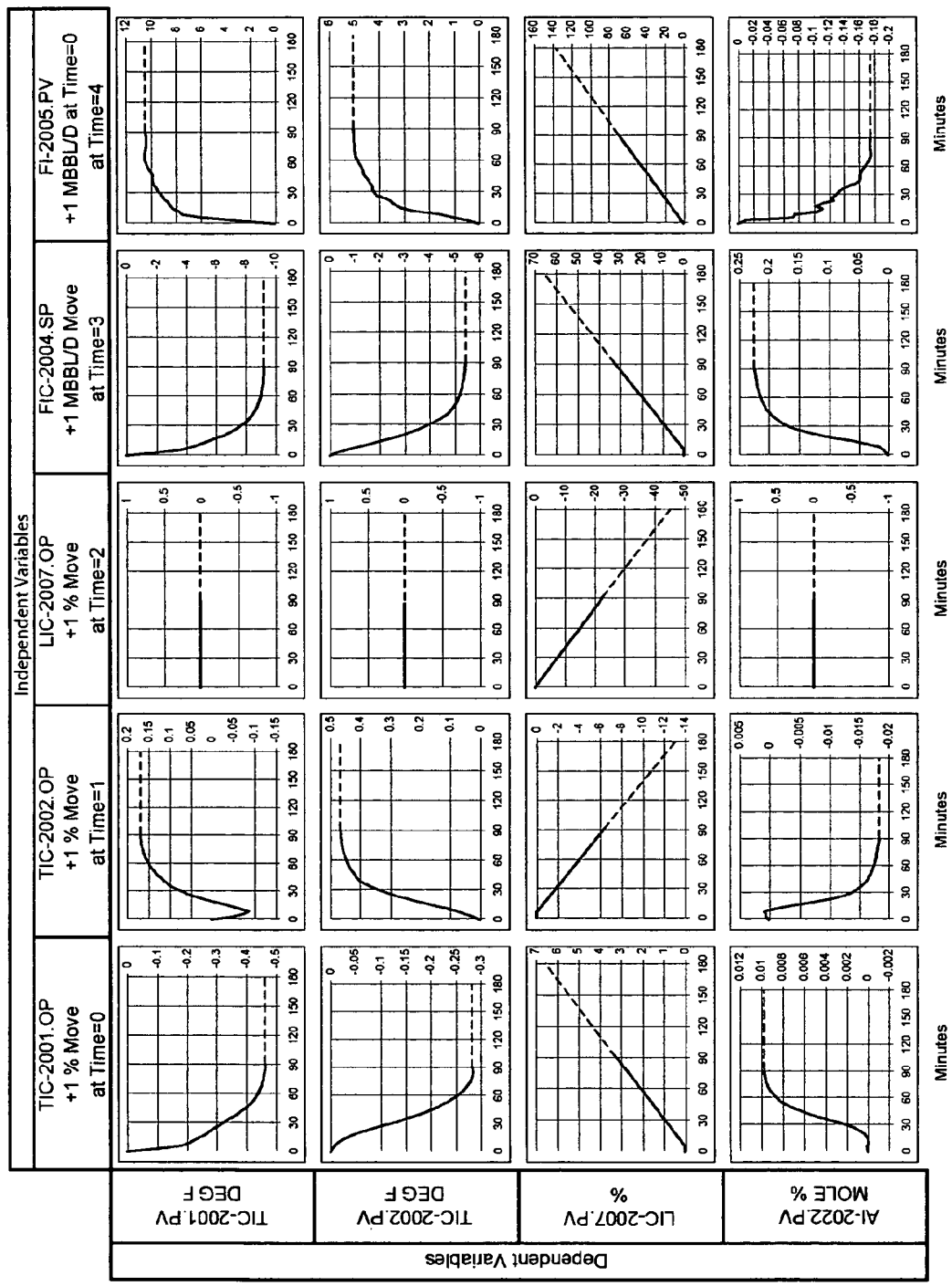
FIG. 5 is a demonstration of the fractionator with the original and recovered values

The new algorithm to remove PID dynamics was applied to the model shown in FIG. 4, and this model with the PID dynamics removed is compared to the original simulation model. As can be seen in FIG. 5, the algorithm successfully recovers the original final control element based model. Note that the steady state time of the recovered model is longer than the steady state time of the original model. This is a result of a longer steady state time for the model with the PID controllers. The original final control element-based simulation model had a steady state time of 90 minutes.

When the PID controllers were configured and the plant step-test performed, it took 180 minutes for the process to reach steady state, due to having to wait for the PID feedback control to settle out. The steady state time of the recovered final control element-based model has the same steady state time as the model containing the PID dynamics from which it was generated. It can be seen, however, that the recovered model has reached steady state in 90 minutes, and if it were truncated at that point, would exactly match the original final control element-based model.

APPLICABILITY OF THE INVENTION TO ON-LINE ADVISORS

The ability to create fast finite impulse response models that have a PID set point replaced by its corresponding final control element position such as a valve position enables the development of an on-line operator advisors as now described. An operator advisor is very different in implementation than an off-line simulator or trainer. The operator advisor deals with the real process in terms of where it is and where it is going. The traditional simulator only deals with historical data and does not interact with the real time data. It does not predict the path the process will follow in coming to steady state. The operator advisor accesses the real time measurements of the process from a time to steady state in the past to predict where the process will go for a time to steady state in the future, thus the operator advisor continuously uses feedback to change the model response. An off-line simulator cannot do this. Heretofore it was unthinkable to use a traditional simulator as an advisor for real time, since it is a stretch to execute the traditional simulator at the same speed as the process. The creation of an open loop final control element FIR model that runs over 100 times the speed of the process, which is an aspect of the instant invention makes it possible to create an operator advisor for the first time. The prediction for the operator advisor of the dependent controlled variables future responses are corrected each execution interval to make the prediction agree with the observed measurement. The open loop final control element model predictions of the operator advisor are not invalided when valves saturate, PID configuration changes are made, or tuning changes made, which is not the case for predictive controllers.

Figure 6:
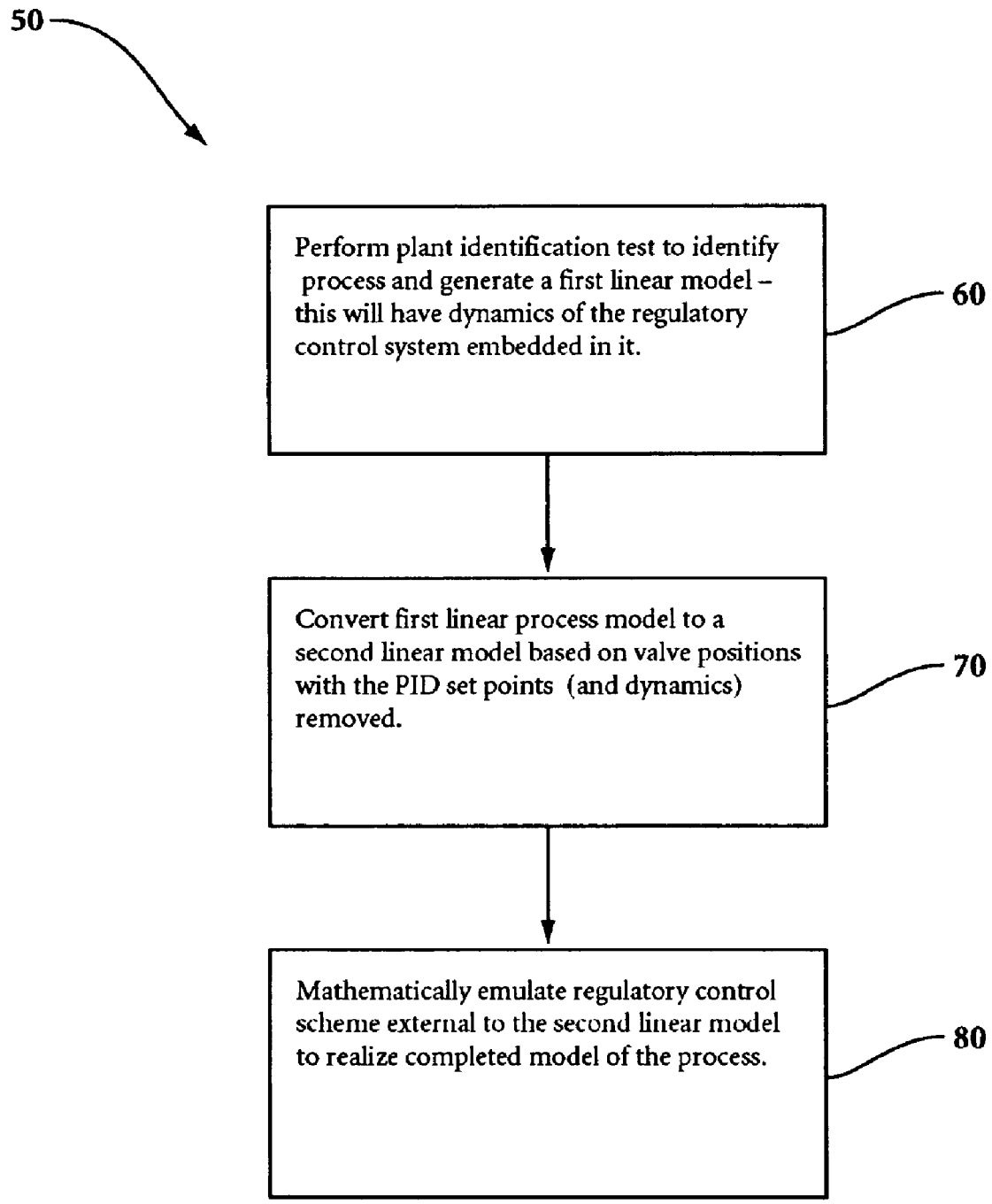
FIG. 6 is a flow sheet representation of the steps of an aspect of the inventive method.

The integrated inventive concept can be seen in FIG. 6, shown generally by the numeral 50. A plant identification test can be performed (step 60) with any stable regulatory configuration and PID tuning and a corresponding model can be obtained. The algorithm to remove the PID dynamics is then applied (step 70) to the resulting model to remove the dynamics of all PID controllers and convert the model inputs from PID set points to valves or final control elements. This is now an open loop FIR model. The regulatory control scheme can then be emulated (step 80) external to the process model via a distributed control system (DCS) console or console emulator to create a completed model. This allows the operator to put PID controllers in Manual-mode, break cascades, retune PID controller, or even re-configure the regulatory control scheme at will. The completed model is now an open loop final control element process model independent of PID dynamics coupled with an emulation of the PID controllers that can be changed by the operator.

It is important to note the importance of now having an open loop process model that is final control element based. A traditional model predicative controller such as a DMC controller uses measurements from the process to update the prediction of the future state of the process but in cases where valves are saturating the prediction is invalidated and that data has to be ignored. With an open loop model that is based on final control elements instead of PID set points the prediction is maintained at all times regardless of what is happening to the PID controllers in the background. Thus the operator advisor model described here can be used for the creation of prediction vectors for predictive multivariable controllers without concern for valve saturation or changes in the regulatory control configuration or tuning. This capability has not been previously available.

An open loop FIR as model can run 50 to 100 times faster than real time. This can be used in two important ways. In a foreground mode the operator advisor can run to provide a continuous prediction of where the process is going based on the past changes in the independent variables and configuration. In a background mode the advisor can advise the operator and provide a training mode to teach new and experienced operators through the use of scenarios. None of these capabilities have been available in the prior art or in practice. The real time background mode permits the operator to see in a few minutes what will happen to his process, hours in the future, if he makes changes to the set points, the tuning, or the configuration of the PID controllers. In the foreground mode the OA software maintains a prediction of the path the process will follow in reaching steady state. The measurements from the process will be used to update the prediction in the same manner as used by a predictive controller except the prediction is based on a open loop model that is not invalidated by valves saturating or by PID tuning or configuration changes. The prediction is maintained at all times regardless of what is happening in the background. After the operator has investigated the changes he wishes to make in the real time background, then he can feel confident in making the changes to his process. The obvious payout for this capability is the prevention of unscheduled shutdowns and safety of the unit.

Because the process is now modeled by a final control element based open loop high speed finite impulse response model (with the PID dynamics removed) it runs much faster than real time in both the aforementioned foreground mode that is running a continuous update into the future and the background mode that enables the operator to ask "what if" questions of the operator advisor. And because the PID control configuration is modeled external to the FIR model the operator, in his model scenarios can change the control configuration or tuning. The operator advisor model can easily be run on a personal computer attached to a plant distributed control system (DCS) and can scan the process and DCS configuration at regular intervals.

Figure 7:
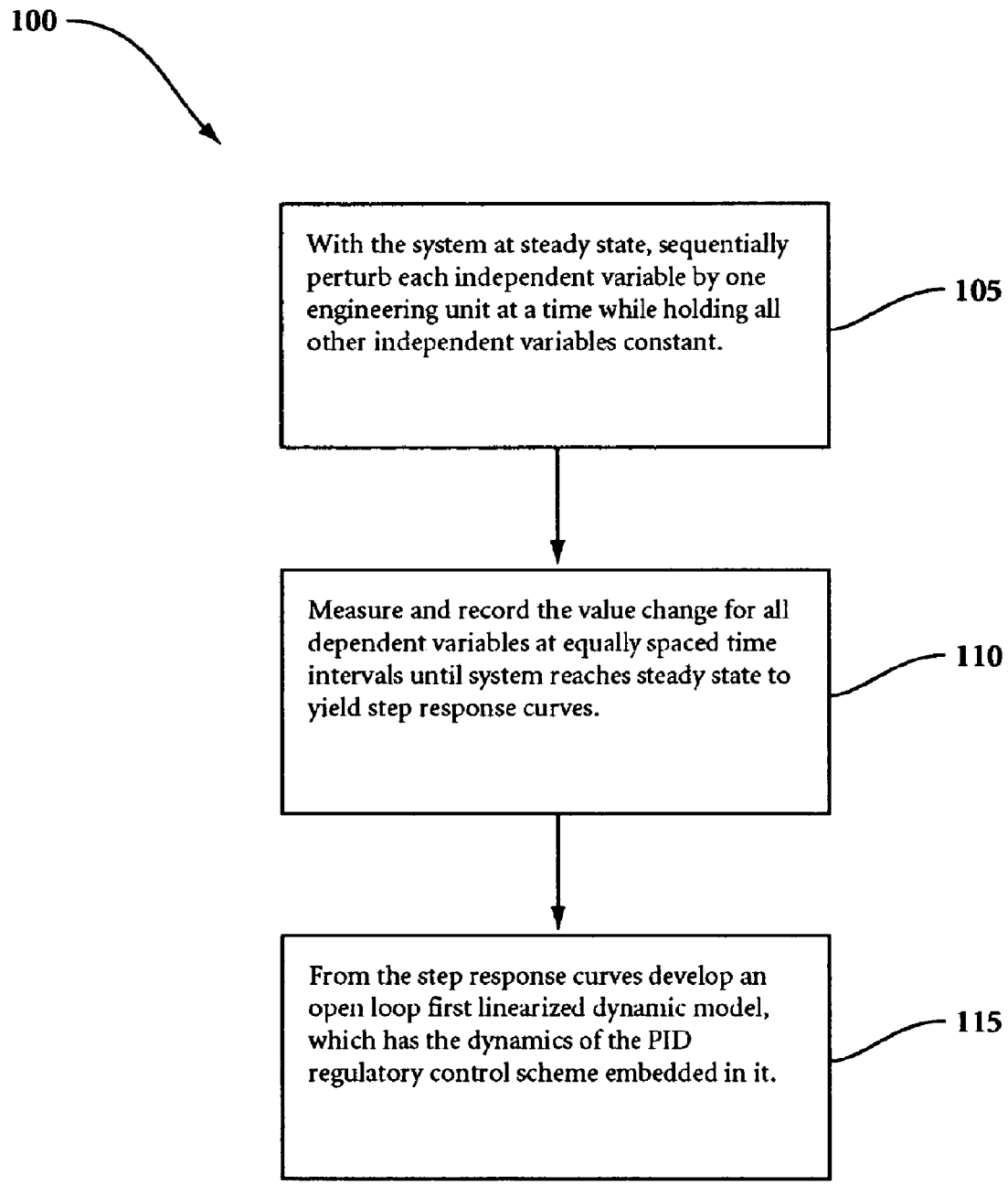
FIG. 7 is a flow sheet representation of the steps of an aspect of the inventive method.

The plant identification of step 80 of FIG. 6 is shown in more detail in FIG. 7 in the steps shown generally as numeral 100. In step 105 each independent variable is perturbed one engineering unit at a time. In step 110, as each independent variable is changed the values of each dependent variables is measured and recorded at equally spaced time intervals until the variable reaches a steady state to yield step response curves. From the step response curves the coefficients of an open loop linearized dynamic matrix are obtained (step 115) in a straightforward manner. As previously mentioned this can take the form of a step response model (SRM) or by taking numerical derivatives of each curve will yield the coefficients of a finite impulse response (FIR) model. The invention anticipates that either of these forms can be used. Because this identification was done with a stable regulatory configuration with its corresponding PID tuning in place the dynamics of that particular regulatory configuration and that particular PID tuning are naturally embedded in that linear model.

Figure 8:
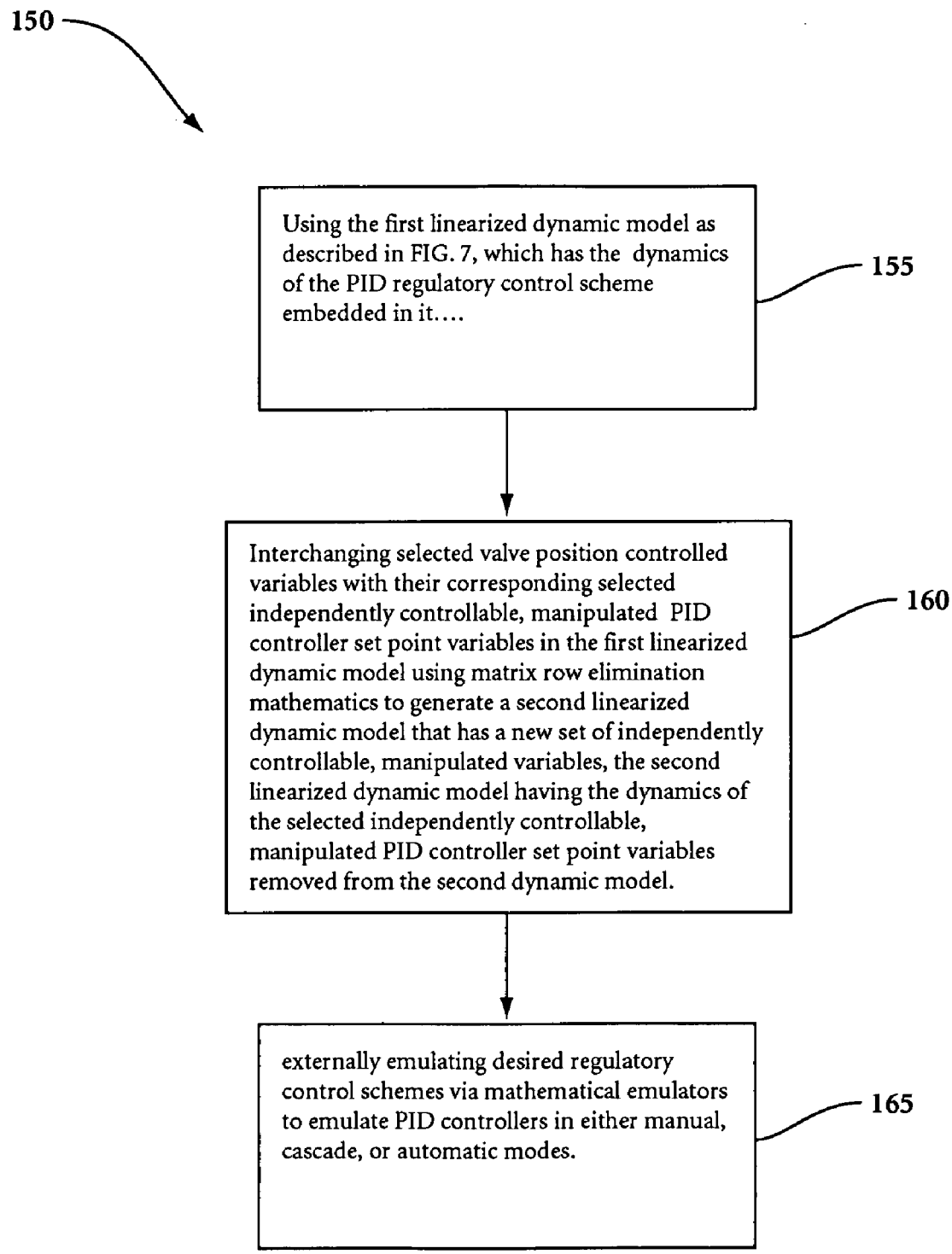
FIG. 8 is a flow sheet representation of the steps of an aspect of the inventive method.

The details of step 70 of FIG. 6 are now shown in FIG. 8 in the steps shown generally as the numeral 150. Beginning with the linearized model developed in step 115 of FIG. 7, step 160 describes the mathematical algorithm which interchanges selected final control element position controlled variables with their corresponding selected independently controllable, manipulated PID controller set point variables in the first linearized dynamic model using matrix row elimination mathematics to generate a second linearized dynamic model that has a new set of independently controllable, manipulated variables, said second linearized dynamic model having the dynamics of said selected independently controllable, manipulated PID controller set point variables removed from the second dynamic model. That second linearized model can now be combined (step 165) with an external mathematical emulation of any PID regulatory control configuration to create a completed new powerful and fast model that can be connected to the distributed control system console for use as an on-line advisor.

The completed operator advisor model is solved using straightforward computer solutions of differential equations after setting the initial conditions. The model can be initialized with historical data or with real time data from the process. When the operator is in the background mode using historical data he can execute scenarios that have previously been designed or create new ones. In the real time background mode the operator can choose the "what if" option and have the simulation initialize the current state of the dependent and independent variables, the configuration and tuning of the PID controllers, and the updated state of the open loop prediction vectors of where the process will go based on all the relevant data from the past. This capability has never before been available to control rooms because existing predictive controller models obtained from process plant identifications have had the dynamics of the one unchanging configuration of PID controllers embedded in the model. It is important to note also that as the operator executes a "what-of" scenario and the results are not satisfactory the operator can halt the execution, modify the scenario, and re-start the advisor multiple times until a desired result is achieved. Each time that is done the operator advisor can also re-access the real time data from the process to initialize the dependent and independent variables, re-initialize the control configuration, re-set the state of the final control element prediction vectors, and then resolve the model. This can be done until a satisfactory change is found. The high speed of the operator advisor model makes this aspect of the invention possible.

While a preferred form of the invention has been disclosed and described in the specification and drawings, since variations in the preferred form will be evident to those skilled in the art, the invention should not be construed as limited to the specific forms shown and described, but instead is as set forth in the following claims when read in the light of the foregoing disclosure.

I claim:

1. A method for creating an on-line operator advisor for use in process simulation and for training simulators for a process having a plurality of independently controllable, manipulated variables and at least one controlled variable dependent upon said independently controllable, manipulated variables; said process operating under a defined regulatory control scheme of proportional-integral-derivative (PID) controllers; comprising the steps of:

gathering data about said process by separately introducing a test disturbance in each of said manipulated variables and measuring the effect of the disturbances on said controlled variable;

using said effects of the disturbances on said controlled variable to generate a first linearized dynamic model relating said at least one controlled variable to said independently controllable, manipulated variables;

interchanging selected final control element position controlled variables with their corresponding selected independently controllable, manipulated proportional-integral-derivative (PID) controller set point variables in said first linearized dynamic model using matrix row elimination mathematics to generate a second linearized dynamic model that has a new set of independently controllable, manipulated variables, said second linearized dynamic model having the dynamics of said selected independently controllable, manipulated proportional-integral-derivative (PID) controller set point variables removed from said second linearized dynamic model and replaced with final control element positions; and externally emulating the regulatory control scheme via mathematical emulators to emulate proportional-integral-derivative (PID) controllers in manual, cascade, or automatic modes to obtain a completed on-line operator advisor of said process.

2. The method of claim 1 wherein said first linearized dynamic model is a step response model.

3. The method of claim 1 wherein said first linearized dynamic model is a finite impulse model.

4. The method of claim 1 wherein said process has at any time a known state of values for the dependent and independent variables, the configuration and tuning of the regulatory control scheme, and values for the open loon final control loop prediction vectors; further comprising the steps of:

a. accessing real time data from said process to initialize said completed on-line operator advisor with the state of the dependent and independent variables;

b. initializing the configuration and tuning of the regulatory control scheme; and c. initializing with the state of the open loop final control element prediction vectors.

5. The method of claim 4 further comprising the step of mathematically solving said completed on-line operator advisor to predict future responses of said at least one controlled variable.

6. The method of claim 5 further comprising the steps of:

a. manually halting said mathematically solving of said completed on-line operator advisor;

b. re-accessing real time data from said process to initialize said completed model with the state of the dependent and independent variables;

c. re-initializing the configuration and tuning of the regulatory control system;

d. re-initializing with the state of the open loop final control element prediction vectors;

e. re-solving the completed on-line operator advisor to predict the future responses of said at least one controlled variable.

7. An on-line operator advisor created by the method of claim 1.

8. An on-line operator advisor created by the method of claim 4.

9. An on-line operator advisor created by the method of claim 5.

10. An on-line operator advisor created by the method of claim 6.

* * * * *